(12) United States Patent
Castleman

(10) Patent No.: US 9,577,911 B1
(45) Date of Patent: Feb. 21, 2017

(54) DISTRIBUTED COMPUTATION SYSTEM INCORPORATING AGENT NETWORK, PATHS AND ASSOCIATED PROBES

(71) Applicant: Black Cloud Analytics, Inc., Basom, NY (US)

(72) Inventor: Robert L. Castleman, Basom, NY (US)

(73) Assignee: Black Cloud Analytics, Inc., Basom, NY (US)

( * ) Notice: Subject to any disclaimer, the term of this patent is extended or adjusted under 35 U.S.C. 154(b) by 0 days.

(21) Appl. No.: 15/076,604

(22) Filed: Mar. 21, 2016

(51) Int. Cl.
*H04L 12/26* (2006.01)
*H04L 29/06* (2006.01)
*H04L 12/24* (2006.01)

(52) U.S. Cl.
CPC ............ *H04L 43/12* (2013.01); *H04L 41/046* (2013.01); *H04L 67/42* (2013.01)

(58) Field of Classification Search
CPC ......... H04L 43/12; H04L 41/046; H04L 67/42
See application file for complete search history.

(56) References Cited

U.S. PATENT DOCUMENTS

| | | | |
|---|---|---|---|
| 5,790,789 | A | 8/1998 | Suarez |
| 6,226,273 | B1 | 5/2001 | Busuioc et al. |
| 6,370,572 | B1 | 4/2002 | Lindskog et al. |
| 6,539,416 | B1 | 3/2003 | Takewaki et al. |
| 7,653,727 | B2 | 1/2010 | Durham et al. |
| 8,065,173 | B2 | 11/2011 | Abu-Hakima et al. |
| 8,200,743 | B2 | 6/2012 | Lee et al. |
| 8,326,914 | B2 | 12/2012 | Lange et al. |
| 8,489,668 | B2 | 7/2013 | Huff et al. |
| 8,661,295 | B1 * | 2/2014 | Khanna ................. H04L 67/125 714/43 |
| 8,671,184 | B2 | 3/2014 | Bush et al. |

(Continued)

OTHER PUBLICATIONS

Dinh, T.H. et al., "A Distributed Mechanism for Probing Overlay Path Bandwidth Using Local Information Exchange", IEICE Trans. Commun., vol. E97B, No. 5, pp. 981-195, May 2014.

Malatras, A., "State-of-the-art survey on P2P overlay networks in pervasive computing environments", J. Network and Comp. Applic., pp. 1-23, 2015.

Martin, D.L. et al.,"The Open Agent Architecture: A Framework for Building Distributed Software Systems", Applied Artificial Intelligence, May 1999.

(Continued)

*Primary Examiner* — Michael C Lai
(74) *Attorney, Agent, or Firm* — Howard Zaretsky; Zaretsky Group PC

(57) ABSTRACT

A system and method of distributed computation based upon a novel partitioning of computer networks. In the distributed computing system of the present invention, instructions are disseminated to select agents on a computer network, each of which is a member of at least one "path," a path being an ordered set of one or more connected agents within the network. The computation is then performed by the agents along the path, and any results then returned. A computation to be performed is broken down into instructions executed on a unique ordered sequence of agents making up a path. This vastly increases the expressive power of a single network to be not only the sum of its parts, but the sum of all possible configurations of those parts on a graph. The basic components of the computing system are agents, probes and paths. The agents are interconnected forming a network and a path is an ordered sequence of agents. Information is exchanged between agents by the sending and receiving of probes between the agents in the network.

17 Claims, 19 Drawing Sheets

(56) References Cited

U.S. PATENT DOCUMENTS

| 9,009,305 | B1* | 4/2015 | Callau | H04L 29/06 |
| | | | | 370/230 |
| 2002/0019844 | A1* | 2/2002 | Kurowski | G06F 9/5072 |
| | | | | 709/201 |
| 2009/0089544 | A1* | 4/2009 | Liu | G06F 17/30445 |
| | | | | 712/30 |
| 2014/0297846 | A1* | 10/2014 | Hoja | H04L 43/10 |
| | | | | 709/224 |
| 2015/0023186 | A1* | 1/2015 | Vasseur | H04L 43/103 |
| | | | | 370/252 |
| 2015/0381459 | A1* | 12/2015 | Xiao | H04L 43/0894 |
| | | | | 370/253 |
| 2015/0381486 | A1* | 12/2015 | Xiao | H04L 45/70 |
| | | | | 370/237 |

OTHER PUBLICATIONS

"Findings Regarding the Market Events of May 6, 2010", US Commodity Futures Trading Commission and US Securities and Exchange Commision, Sep. 30, 2010.
"Final Report on the Implementation of Task Force Recommendations", US-Canada Power System Outage Task Force, 2006.
Bieszczad, A. et al., "Mobile Agents for Network Management", IEEE Comm. Surveys, vol. 1, No. 1, 1998.
Cheng, J. et al., "Robust and self-repairing formation control for swarms of mobile agents", AAAI Proc. of the 20th national conf. on Artificial intelligence, pp. 59-64, 2005.
Lutimath, N.M. et al.,"A Survey of Ant based Routing Algorithms for Mobile Ad-hoc Network", Int'l J. Adv. Res. in Comp. Sci and Soft. Eng.,vol. 2,issue 8, pp. 89-93, Aug. 2012.

* cited by examiner

DISTRIBUTED COMPUTATION SYSTEM INCORPORATING AGENT NETWORK, PATHS AND ASSOCIATED PROBES

FIELD OF THE DISCLOSURE

The subject matter disclosed herein relates to the field of network computing and more particularly relates to a distributed computation system and method based on a network incorporating paths, agents and related probes exchanged between the agents.

BACKGROUND OF THE INVENTION

To aid in understanding the prior art and the problems associated therewith, it is helpful to provide a brief overview of distributed computing environments. The field of distributed computing is a well known field in computer science that deals with distributed systems. A distributed system is a software system in which components located on networked computers communicate and coordinate their actions by passing messages. The components interact with each other in order to achieve a common goal. Three significant characteristics of distributed systems include concurrency of components, lack of a global clock, and independent failure of components. Examples of distributed systems vary from SOA-based systems to massively multi-player online games to peer-to-peer applications.

Distributed computing also deals with the use of distributed systems to solve computational problems. In distributed computing, a problem is divided into many tasks, each of which is solved by one or more computers, which communicate with each other by message passing.

The computational entities are typically referred to as nodes. A distributed system may have a common goal, such as solving a large computational problem. Alternatively, each computer may have its own user with individual needs, and the purpose of the distributed system is to coordinate the use of shared resources or provide communication services to the users.

Other typical properties of distributed systems include the ability to tolerate failures in individual computers and/or nodes. The structure of the system (i.e. network topology, network latency, number of computers) is not known in advance, the system may consist of different kinds of computers and network links, and the system may change during the execution of a distributed program. In addition, each computer has only a limited, incomplete view of the system and each computer may know only one part of the input.

Distributed computing can make use of various hardware and software architectures. At a lower level, multiple CPUs are interconnected with some sort of network, regardless of whether that network is printed onto a circuit board or made up of loosely coupled devices and cables. At a higher level, processes running on those CPUs are interconnected with some sort of communication system.

Currently, distributed programming typically falls into one of several basic architectures: client-server, three-tier, n-tier, or peer-to-peer; or categories: loose coupling, or tight coupling. Client-server architecture is a hierarchical architecture for distributed computing environments that is generally divided into two layers. One layer within the client-server architecture includes most of the application systems. Application systems include fourth generation languages, computer aided software engineering tools, programming languages and their support tools, and various other commercially available software products. This first layer typically represents the client layer. In client-server architectures smart clients contact the server for data then format and display it to the users. Input at the client is committed back to the server when it represents a permanent change.

A second layer within the client-server architecture includes most of the information service systems. The information service systems are software products such as database management systems and data repositories, specialized data access methods, application servers, and any number of service based monolithic software systems. This second layer represents the server layer.

The client-server architecture also includes a third or middle layer. This third layer typically includes software products designed to provide various infrastructure or interfacing services between other components of the distributed computing environment such as between an application system and an information service system. Such software products are classified as middleware products or systems. A recent term for the hierarchical architecture that utilizes middleware systems is a three-tier system or multi-tier system architecture, where the middleware system consists of software products, applications and services that had previously existed either in the client layer or server layer. Three-tier or multi-tier layers are well known in the art.

Three-tier architectures move the client intelligence to a middle tier so that stateless clients can be used. This simplifies application deployment. For example, the majority of web applications are three-tier. n-tier architectures refer typically to web applications which further forward their requests to other enterprise services. This type of application is the one most responsible for the success of application servers.

In peer-to-peer architectures there are no special machines that provide a service or manage the network resources. Instead all responsibilities are uniformly divided among all machines, known as peers. Peers can serve both as clients and as servers. A peer-to-peer architecture provides any number of peers or service providers while removing some of the constraints imposed by a traditional client-server or other hierarchical architecture. Within a peer-to-peer system architecture, each peer provides one or more services and is able to cooperate and collaborate with fellow peers as services need to be performed concurrently or sequentially.

Another basic aspect of distributed computing architecture is the method of communicating and coordinating work among concurrent processes. Through various message passing protocols, processes may communicate directly with one another, typically in a master/slave relationship. Alternatively, a "database-centric" architecture enables distributed computing without any form of direct inter-process communication, by utilizing a shared database.

One important requirement of application systems operating within a distributed computing environment is scalability. Scalability is the ability of an application system and information service system to address computer environments that range from small (i.e. small numbers of users and computers) to very large computing environments (i.e. large numbers of users and computers) without the significant loss of efficiency. There is a growing demand for a distributed computing system architecture to incorporate such advantageous features as scalability, fault-tolerance, support of legacy applications, and other features such as modeling and simulation capabilities, etc., without significantly contributing to the complexity of the computing environment and without significantly sacrificing performance of the distributed computing system.

An alternative technique aimed at addressing some of the aforementioned problems arising in distributed computing environments is the application of agent technology. The notion of agents and agent technology already exists in the information industry. A standard definition of what an agent entails, however does not exist. A common perception of an agent is a software module or process that accomplishes a task, typically on behalf of a user. For example, conventional agents can filter electronic mail messages for a user based on a specific criterion to reduce the number of junk mail that a user receives.

Disadvantageously, the more an agent looks and functions as a customized software process, the less likely that agents will be able to cooperate with other customized agents operating within the distributed computer environment. Many of the related art agents, both static and dynamic, operating within a distributed computing environment inevitably demonstrate different behaviors and characteristics. Because these different agents often need to cooperate with one another within the distributed computing environment to accomplish various tasks, however, there is a need to facilitate communication between different agents. This is especially true where the agents are associated with different application systems or services. To that end, there is a need to provide a universal or generic architecture for agents which facilitates the cooperative behavior of agents associated with different applications or services. The architecture of an agent based computing system should be independent of the environment in which it exists and independent of the application system or service which it supports. Further, there is a need for a distributed computing architecture that is capable of expanding the computing power that can be expressed by the nodes of a network.

SUMMARY OF THE INVENTION

The present invention is a system and method of distributed computation based upon a novel partitioning of computer networks. In the distributed computing system of the present invention, instructions are disseminated to select agents on a computer network, each of which is a member of at least one "path," a path being a set of one or more connected agents within the network. The computation is then performed by the agents along the path, and any results then returned. The return value of a computation or task can be placed into the payload of a probe and returned to another agent. In one embodiment, the return value typically travels from a primary agent, through zero or more other agents to the control server, but other paths for the return value are also possible.

The novelty of the distributed computing network of the present invention versus a conventional distributed computing architecture is in breaking down a computation not into instructions on individual agents, but into instructions executed on a unique ordered sequence of agents. This vastly increases the expressive power of a single network to be not only the sum of its parts, but the sum of all possible configurations of those parts on a graph.

The basic components of the distributed computing system are agents and paths. The agents are interconnected forming a network. A path is an ordered sequence of agents. Information is exchanged between agents by the sending and receiving of probes amongst the agents in the network. Probes are also used to distribute tasks to one or more agents in the network. Probes are not necessarily broadcast to all agents and neither are they sent only point to point. Rather, probes follow the path assigned to them. Thus, they only travel to the agents within the ordered sequence of the path.

There is thus provided in accordance with the present invention, a distributed computing system, comprising a plurality of interconnected hosts one or more of which are in communication with the control mechanism, a plurality of agents, each agent residing on a host wherein each host is operative to host one or more agents, each agent linked to at least one other agent thereby forming a distributed computing network and operative to receive, process and dispatch probes amongst the agents, each agent comprising one or more probe queues operative to receive and hold probes for processing by the agent, at least one task to be performed by the agent, and wherein probes traverse the computing network in accordance with a defined path consisting of an ordered sequence of agents to be visited by a particular probe.

There is also provided in accordance with the present invention, a distributed computing system, comprising a plurality of interconnected hosts, a plurality of agents, each agent residing on a host wherein each host is operative to host one or more agents, each agent linked to one or more other agents at least part of the time thereby forming a primary computing network and operative to implement a desired objective of the computing network, each agent operative to receive, process and dispatch probes amongst the agents, each agent comprising one or more probe queues operative to receive and hold probes for processing by the agent, at least one task to be performed by the agent, a control mechanism connected to at least one agent and operative to control the computing network and to generate one or more control probes to be injected into the computing network via the connected agent, wherein probes traverse the computing network in accordance with a defined path consisting of an ordered sequence of agents to be visited by a particular probe, and wherein a probe task is defined along the ordered sequence of agents.

There is further provided in accordance with the present invention, a method of distributed computing, the method comprising providing a plurality of interconnected hosts, providing a plurality of agents, each agent residing on a host wherein each host is operative to host one or more agents, each agent linked to one or more other agents thereby forming a primary computing network and operative to collectively implement a desired objective of the computing network, on each agent, receiving, processing and dispatching probes amongst the agents, on each agent, receiving and holding probes for processing by an agent in a probe queue, on each agent, performing at least one task, controlling the computing network utilizing a control mechanism in communication with at least one agent, generating control probes and injecting them into the computing network via an agent in communication with the control mechanism, wherein probes traverse the computing network in accordance with a defined path consisting of an ordered sequence of agents to be visited by a particular probe, and wherein a probe task is defined along the ordered sequence of agents.

There is also provided in accordance with the present invention, a method of distributed computing, the method comprising providing a plurality of interconnected hosts, providing a plurality of agents, each agent residing on a host wherein each host is operative to host one or more agents, each agent linked to one or more other agents thereby forming a computing network, receiving, processing and dispatching probes containing at least one of data, object code and source code amongst the agents, defining a path through the computing network to be traversed by the probes as an ordered sequence of agents to be visited by a probe, breaking down a computation into task instructions to be performed on a path, performing the computation by the agents within a path and returning any results, controlling the computing network utilizing a control mechanism in communication with at least one agent, and generating control probes and injecting them into the computing network via an agent in communication with the control mechanism.

BRIEF DESCRIPTION OF THE DRAWINGS

The invention is herein described, by way of example only, with reference to the accompanying drawings, wherein.

DETAILED DESCRIPTION

Figure 1:
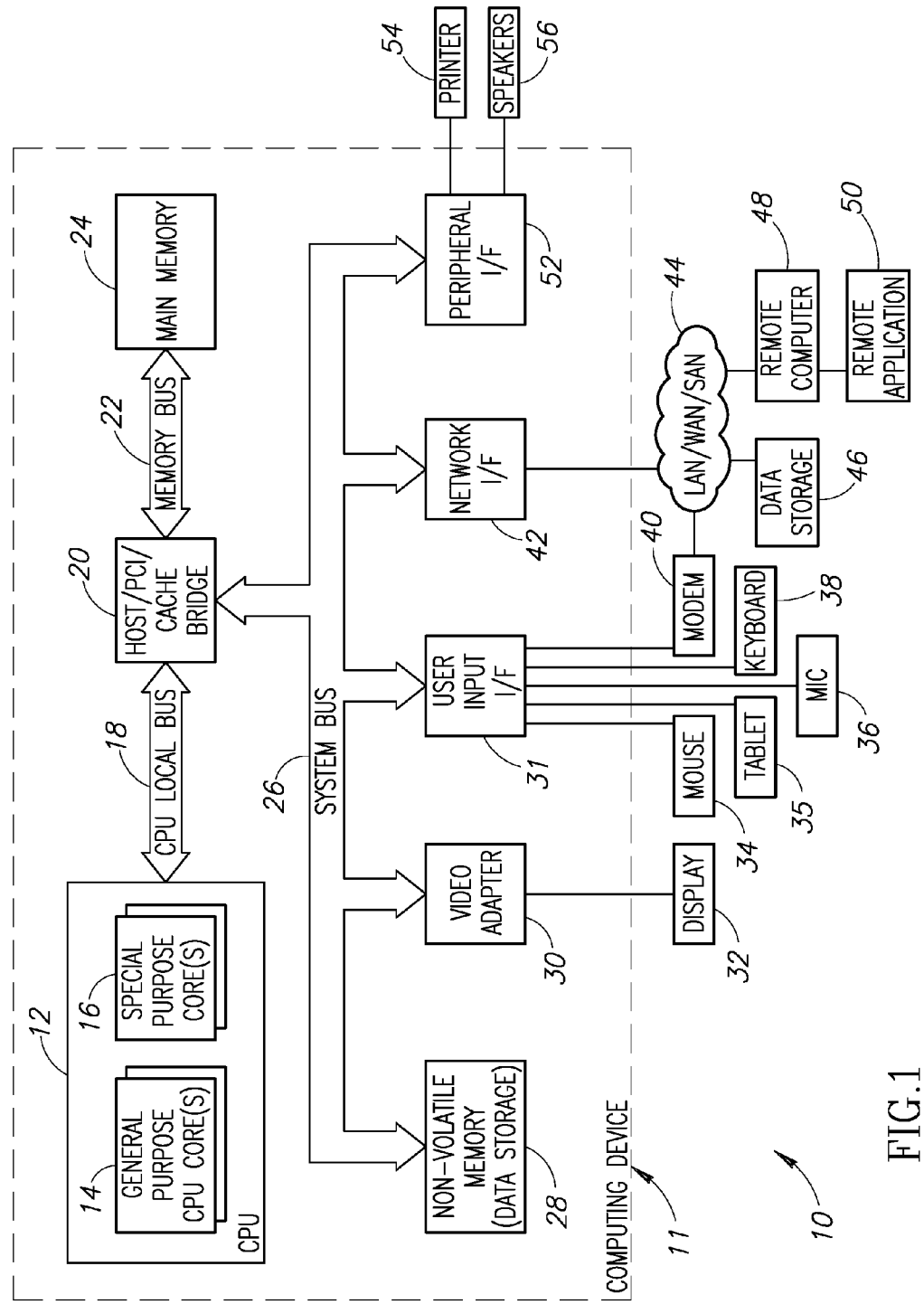
FIG. 1 is a block diagram illustrating an example computer processing system adapted to implement the distributed computing system of the present invention.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

The following definitions apply throughout this document. The term host is defined as a computer or computational device or entity within which an agent resides (i.e. that contains an agent). The term host metric is defined as the one or more values that indicate the state information of a host. The term agent is defined as an entity that links to other agents thereby forming a network (i.e. nodes in a directed graph or digraph). An agent performs a single unit of computation, e.g., aggregating data, performing complex mathematical computation with conditional factors, etc. The term probe is defined as an entity that traverses a network of agents. The term distributed computing system is defined in its conventional sense and it intended to include a collection of interconnected agents, the associated probes that traverse the network and their corresponding paths. The term path is defined as an ordered sequence of agents visited by a probe (i.e. the particular vertices of the digraph traversed by a probe where each vertex is an agent/host). The present invention enables a 'task' to be defined along a sequence of agents, hosted on one or more computers. Thus, it is a sequence of agents that performs a task as a combined entity rather than a single node as in conventional distributed computing systems.

The term agent task is defined as those behaviors assigned to a particular agent. The term primary agent is defined as an agent that implements the primary functions of a computing network. The term control probe is defined as a probe that is used as part of a control mechanism for the distributed computing system. The term probe owner is defined as the agent that owns a particular probe. The term probe type is defined as an indicator that identifies the type of probe. Example types include messaging, control or working probes. The term probe queue is defined as a component of an agent that receives and processes probes. The term foreign probe is defined as a probe not owned by the processing agent. The term free probe is defined as a probe without an owner. The term message probe is defined as a probe used to pass messages through the computing network. The term working probe is defined as a probe that executes the directives of a computing network. The term payload is defined as the information attached to a probe and carried over the path of the probe. The term path length (or path depth) is defined as the number of steps in a probe's path.

The term fitness metric is defined as the one or more values that indicate the fitness of a particular agent. The term fitness function is defined as the function for managing the fitness metric of an agent. The term memory depth is defined as how far into the past an agent 'remembers' previous states.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C# or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

In addition, the invention is operational in systems incorporating sensors such as found in automated factories, in mobile devices such as tablets and smartphones, smart meters installed in the power grid and control systems for robot networks. In general, any computation device that can host an agent can be used to implement the present invention.

A block diagram illustrating an example computer processing system adapted to implement the electronic catalog system of the present invention is shown in FIG. 1. The exemplary computer processing system, generally referenced 10, for implementing the invention comprises a general purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores execute functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, non-volatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Overview of the Distributed Computing Architecture of the Present Invention

As mentioned supra, the distributed computing system of the present invention is a system and method for distributed computation based upon a novel partitioning of computer networks. In the system, instructions are disseminated to select agents on a computer network, each of which is a member of at least one "path" (i.e. a set of one or more connected agents also within the network). The computation is then performed by the agents of the path, then returned. The system is operative to break down a computation not into instructions on individual agents, but rather into instructions on a unique ordered sequence of agents. This vastly increases the expressive power of a single network to be not only the sum of its parts, but the sum of all possible configurations of those parts on a graph.

The fundamental components of the system are agents, probes and paths. An agent is a computer (or computational device) that performs a single unit of computation, e.g., aggregates data or performs a complex mathematical computation with conditional factors.

A path is an ordered sequence of agents. In a path of n agents, we can identify agents by their sequence number $i_1, \ldots, i_{n-1}, i_n$. There is no restriction to path constructions as path lengths may be finite or infinite. Paths may loop, be singular, or overlap in any fashion. Thus, if any given agent is i and its identity is ident(i), it may be that ident($i_j$)=ident($i_k$) for any $1 \le j$, $k \le n$. Note that it is possible that a sequence of n agents be entirely composed of the same agent. Further, a path is uniquely identified by the order of its members: two paths with the same sequence of agent identity are by definition the same path. Note, however, that two probes can traverse an identical path and exhibit completely different behaviors. Further, a probe can traverse the same path multiple times and exhibit different behavior each time. Note also that an effectively infinite path is possible if a free probe is assigned a non-terminating random walk through the graph. Other "quasi-infinite" pathing is also possible. In addition, the traversal of the edge of a graph can have effects on the behavior of a computing network due to variations in transit time. This means that a set of probes cannot be counted on to arrive in any particular order and hence and agent could process the same set of probes at different times and get a different result each time.

In one embodiment, agents are able to communicate with their neighbors. The underlying method of communication between any two agents in a path depends upon the underlying computing device. Throughput this document, the term "neighbor" is used to describe the agents before and after the given agent in a path. Thus, given agent $i_j$ and j>0, agents $i_{j-1}$ and $i_{j+1}$ are the agent's neighbors. Note however that a path that terminates has no previous neighbor to the first agent of the path and no next neighbor to the last agent of the path.

Pathing is important to a computing network as communication with other agents happens through the exchange of probes along defined paths. The assignment of a path is performed using methods described infra. The actual structure of a path is also important. The path structure is dependent on the particular implementation. This document uses the term "neighbor" where two nodes of a graph are neighbors if the path length between them is one. This, however, is independent of the structure of the entire graph. The algorithm that determines the path is dependent on the purpose of the distributed computing network. For example, consider an analysis of transit time between internet routers. In this case, the pathing reflects the actual connections made among the internet infrastructure and their geographical location. In a financial application, for example, agents are attached to individual stock issues on the New York Stock Exchange and the pathing of the probes weighted according to industry segment. In one embodiment, the pathing is generally assigned by the control system, but paths can "self modify" by probes interacting with agents in their path. In this case the path would be modified without intervention from any control mechanism.

Regarding knowledge of the network, agents generally know very little about the network as a whole. Agents only gain such knowledge by interacting with probes received from other agents. The knowledge an agent has can be effected by how the computing network is bootstrapped. In one embodiment, the control server contains an exhaustive list of agents, which is only necessary during bootstrapping. Once the computing network is initialized, this "knowledge" is actually embodied in the probe payloads, paths and agent states of the network itself. Once initialized, the control server discards the exhaustive list and a properly implemented computing network can still function.

Regarding communication between agents, communication via probes is differentiated from the communication protocols of the host devices. The only form of communication between agents is through the exchange of probes. The communication protocols of the hosts are utilized by the agents and probes.

As described supra, an agent is connected (i.e. in communication with) to one or more other agents. The connection, however, may be temporary in that an agent only communicates with other agents part of the time. For example, for security reasons, an agent may lie disconnected from other agents for most of the time while connecting with one or more agents only for heartbeat purposes or to send and receive probes and then returns to a disconnected state.

A computing device participates in the network by running agent software. Any computer device may run multiple instances of the agent software, each of which may be configured to connect and operate within different computing networks. This implies that each agent carries an identifier used to distinguish between traffic from other networks. There are no restrictions on the number of agents that may be hosted except for the limitations of system and network resources.

A computation in a distributed computing network comprises a sequence of instructions (such as those described above) upon the unique ordered sequence of agents in a path. Using the example of aggregating data, data from each machine might be aggregated into a vector representative of the path, where each vector's elements corresponding with the path index would be fulfilled by that agent in the path. Note that computation may occur in parallel or in ordered sequence across the path.

Note that path computation is not necessarily sequential across agents, although in some instances (e.g., network monitoring) the transit time between agents is itself a component of the computation. In the parallel case, computation is performed independently, but accumulated in an ordered sequence.

A computation is not restricted to any form: computation may be as simple as a single hardware instruction, or as complicated as data analysis and beyond. Computation may consist of gathering and producing data, performing some sort of processing, etc.

A special type of computation performs administrative tasks on behalf of the network itself. For example, assume a series of non-overlapping computation paths on a network. Then create another path referred to as an administrative path that spans each of the computation paths at the head and tail of each path's sequence. The function of the administrative path could be to produce instructions to the head agent and consume from the tail.

By the definition of a sequence of agents (i.e. a path), neighboring agents must necessarily be connected. The manner of this connection is not restricted to any particular form and is not critical to operation of the invention: agents may communicate indirectly through a relay server, or by a direct network or modem connection.

An agent that cannot communicate with its neighbors is still a member of the path, but that path is considered degenerative until communication is reestablished. The process of detecting degenerative paths may itself be a computation performed by a network, where paths overlap strongly to enable detecting faulty links between any two neighbor agents.

An agent network is defined by the agents that identify with the given network. Thus, for example, if there are four uniquely identified agents within a system, the network is said to be of size four.

The method of path construction can be either static (i.e. exogenous) or dynamic (i.e. endogenous). For example, a agent's paths may be predefined when that agent is installed. Path creation may also be part of a computation request, in which case the path overlay is dynamic. Paths need not follow any special creation logic. In some embodiments, paths may be completely random, such as for an application for conditional logic analysis where random perturbations are important.

In some cases, a network agent will start up and contact a predefined agent or set of agents within its network for a configuration, where the set of agents have a long running instruction to perform this function. In other cases, a fixed "master" administrative agent (e.g., control mechanism) fulfills this function. In other embodiments, an agent starts up and broadcasts to any available configuration. In another embodiment, an agent may have instructions to start up and, failing to find any other agents, itself listen for other agents and act as a master agent.

Control of a network depends upon its structure. In one embodiment, agents are directly or indirectly part of an administrative path (which may comprise one "master agent" which may be a control server, for example). A human administrator may then execute commands on the control server, which propagates through administrative paths to each agent. In one embodiment, a control mechanism (e.g., computer, server, mobile device, etc.) equipped with a user interface, analytical tools, databases, etc. is connected to or co-located on one of the agents in the network. Probes (e.g., control probes) containing control information and/or control related tasks are generated by the control mechanism and passed to the agent on the agent. The agent functions to inject the control probes into the computing network.

Distributed Computing Architecture Components:
Agents, Paths and Probes

Figure 2:
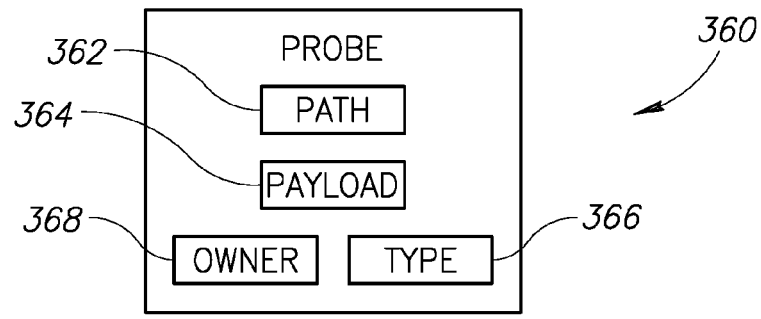
FIG. 2 is a diagram illustrating the structure of an example probe in accordance with the present invention.

A diagram illustrating the structure of an example probe in accordance with the present invention is shown in FIG. 2. The probe, generally referenced 360, comprises a plurality of fields including a path 362, payload 364, type 366 and owner 368. Note that a probe may comprise other fields in accordance with the particular implementation of the present invention.

Figure 3:
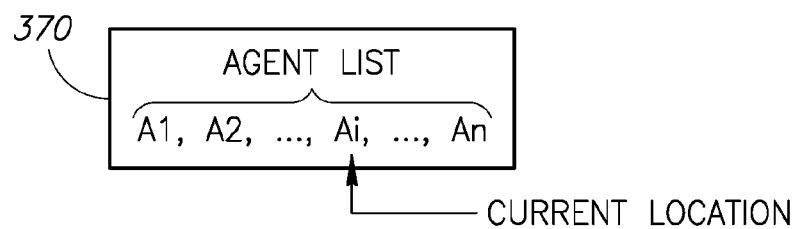
FIG. 3 is a diagram illustrating an example path portion of a probe consisting of an agent list.

A diagram illustrating an example path portion of a probe consisting of an agent list is shown in FIG. 3. The path 370 is a sequence of values (e.g., A1, A2, . . . , Ai, . . . An) specifying the graph edges traversed by a probe. Each value in the path specifies the location of an agent in the graph (i.e. the computing network). In one embodiment, the path is a list with an index pointing to the value that indicates the current location in the graph. In this example, the current location is indicated by Ai. In operation, the probe traverses the graph in list order unless overridden by specific actions of an agent. The path can be modified by any agent in a probe's path list.

In one embodiment, agents do not require knowledge about the structure of the graph (i.e. network). It simply passes probes to the next agent. Its task can include instructions to issue control probes under prescribed conditions.

Paths are generated and modified through multiple methods. Bootstrapping a computing system utilizes a control server that has a comprehensive list of all agents in a nascent computing system. The control entity or server assigns paths as needed to initialize the computing system. Once bootstrapped, however, the control mechanism can modify the probe paths of any agents in the system. An agent can even be tasked to create new agents and insert them into the primary computing network with or without the intervention of a control mechanism or server.

Figure 4:
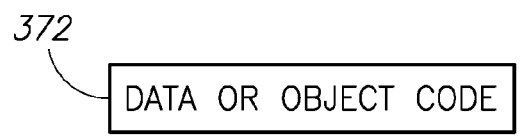
FIG. 4 is a diagram illustrating an example payload portion of a probe consisting of data or object code.

A diagram illustrating an example payload portion of a probe consisting of data, object code and/or source code is shown in FIG. 4. The payload 372 of the probe is part of the storage and transport mechanism of a computing system. The payload may comprise any form of data, data structure, executable code (i.e. object code) or uncompiled code (i.e. source code). The payload can also comprise an agent as object code or a serialized object. The payload can be added, removed, modified, executed or compiled by any agent in the path list.

The type portion 366 of a probe is an identifier that is used to encapsulate specific behaviors. Example behaviors include control, messaging and working. Note that this field (or element) is programmable and is therefore not limited to these three types. Note also that the probe type can be correlated to a queue type.

Figure 5:
FIG. 5 is a diagram illustrating an example owner portion of a probe consisting of an agent ID.

A diagram illustrating an example owner portion of a probe consisting of an agent ID is shown in FIG. 5. A probe can be owned by a particular agent. The ownership field indicates the agent that owns the probe. An agent has special rights when processing a probe that it owns, enabling operations that could not otherwise be performed if not owned by the agent. Note that ownership of a probe can be transferred or revoked. A probe without a designated owner is a free probe. Ownership can be identified by an agent ID field 374 in a probe or a probe ID field in an agent. Note also that probes can be co-owned by two or more agents.

Figure 6:
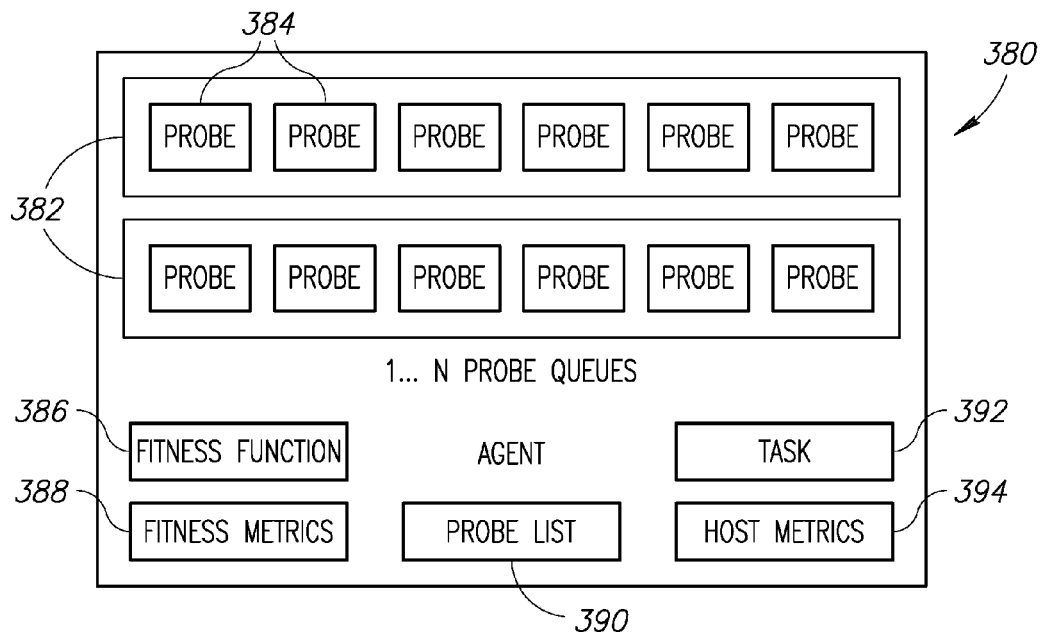
FIG. 6 is a diagram illustrating the structure of an example agent in accordance with the present invention.

Agents are the entities residing on hosts that receive, process, generate and transmit probes to other agents. A diagram illustrating the structure of an example agent in accordance with the present invention is shown in FIG. 6. In one embodiment, agents, generally referenced 380, comprise one or more probe queues 382, one or more fitness functions 386, one or more fitness metrics 388, one or more probe lists 390, one or more tasks 392 and one or more host metrics 394.

An agent comprises one or more probe queues 382. Each non-empty probe queue (queues may be empty) comprises one or more probes 384. The probe queue receives and holds (i.e. stores) probes for processing by the agent. After processing is complete, a probe is either (1) dispatched to the next agent in the probe's path list; (2) deactivated; or (3) destroyed.

The task 392 is the agent's 'mandate' or 'mission' in the computing network and may include any interaction with the host probe, probe queues, host metrics, fitness metrics or fitness functions. Alternatively, the task may be entirely independent of any of the above elements. Example tasks include (1) reading a value from a sensor in a highly automated manufacturing system; (2) processing a probe payload; and (3) invoking host behaviors e.g., toggling a switch.

Host metrics 394 comprise data and/or functions that define the current state of the agent's host. An agent can own one or more probes. Ownership is indicated by (1) a probe list 390 of probe IDs in the agent; or (2) a probe list of agent IDs in a probe. Note that probes can be co-owned by a plurality of agents.

The fitness function 386 manages the fitness of an agent. The fitness metric 388 represents the overall health of an agent. The fitness metric may comprise a single scalar value, a complex set of values and data structures or another computing network. It is noted that the present invention supports flat, hierarchical and recursive structures. A probe carrying an agent carrying a probe carrying an agent creates recursion. The ability to handle recursion enables the creation of numerous possibilities for network behavior. A probe may also have a null payload (i.e. no payload). This is useful in situations where it is desired to modify network behavior by injecting multiple probes without a payload, thereby slowing down the network or for identifying bottlenecks in network throughput.

Figure 7:
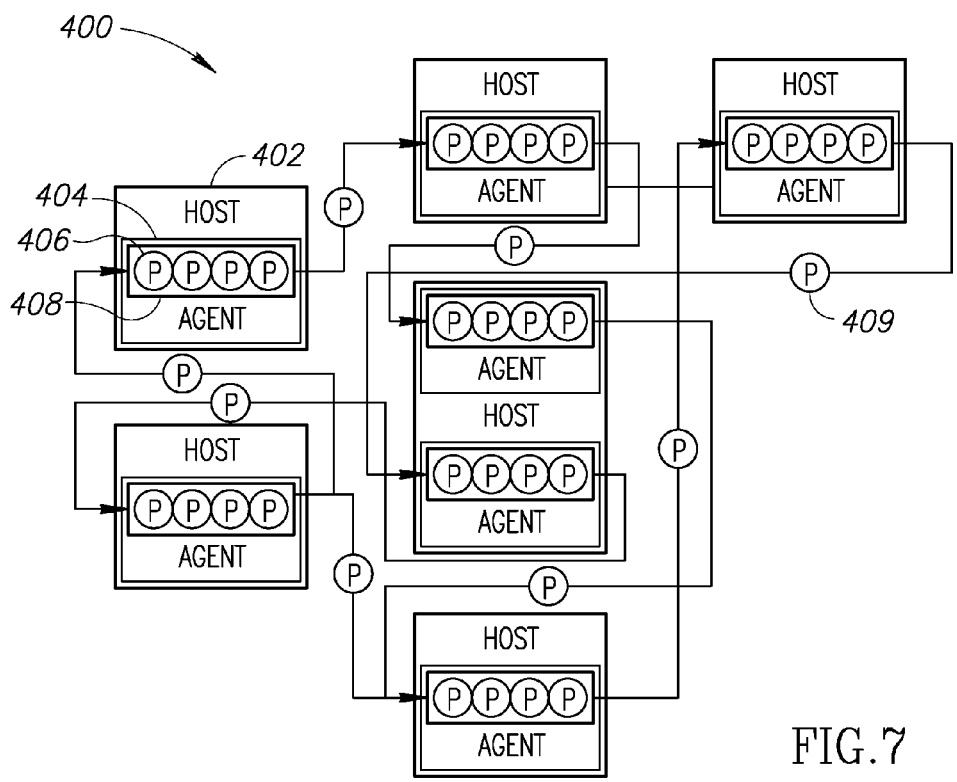
FIG. 7 is a diagram illustrating the structure of an example distributed computing system constructed in accordance with the present invention.

A diagram illustrating the structure of an example distributed computing system in accordance with the present invention is shown in FIG. 7. The system, generally referenced 400, comprises a plurality of agents 404 each residing on a host 402. Each agent comprising at least one probe queue 408 comprising a plurality of probes 406. In operation, any number of probes 409 may be traversing the network being exchanged between agents.

The computing system is the collection of agents exchanging probes. Each agent resides on a host and a host may be hosting one or more agents. In one embodiment, the exchange of probes is asynchronous. Although in an alternative embodiment, the exchange of probes may be fully synchronous. A host may comprise any physical or virtual device or software. The hosts are not required to be of the same type. Note that a heterogeneous computing network may comprise any combination of software and hardware hosted agents.

In one embodiment, probes are owned by an agent. This does imply, however, that paths can be circular, starting and ending at the owning agent. Ownership can allow selective processing of probes by an agent. An agent can be configured (i.e. programmed) to only respond to probes owned by a specific agent or it could be configured to clone or destroy probes owned by a particular agent. In the case where an agent is tasked with reacting to probes from a specific agent, when a probe is received from that specific agent, it can then be destroyed or re-pathed, never returning to the originating owner. In this case, the original owner might be programmed to issue a probe at set time intervals or issue a new probe if an issued probe has not returned within a specified time interval.

Probes always have their paths assigned or altered by an agent or control server. This raises the possibility that a probe carrying an agent as a payload can arrive at an agent that interacts with that payload and adjusts the probe's path. A recursive network can be created, for example, if the carried agent also owns probes that have agents as payloads.

Note that an unconnected agent is generally considered an anomaly, but may occur in practice. In one embodiment, one or more agents can be tasked with reconnecting an orphaned agent. Alternatively, an agent could be programmed to "phone home" if it remains disconnected for a predefined length of time. In addition, note that an agent could deliberately disconnect itself from the network as a security measure, reconnecting to one or more agents at some future time to complete its task(s).

As described supra, each agent comprises one or more probe queues. The queue plays a role in the control mechanism of the computing network. An agent receives probes from the network and processes them in accordance with instructions defined in the agent task 392 (FIG. 6). Note that probe queues can be typed. A typed probe queue can only receive probes that match its particular type (e.g., control, message, working, etc.). Typed probe queues make the implementation of probe processing less complex. Typed probes can be processed in a general queue as long as the agent task is configured (i.e. programmed) to handle that particular probe type. In another embodiment, a single probe queue is used to receive all probes regardless of type.

Figure 8:
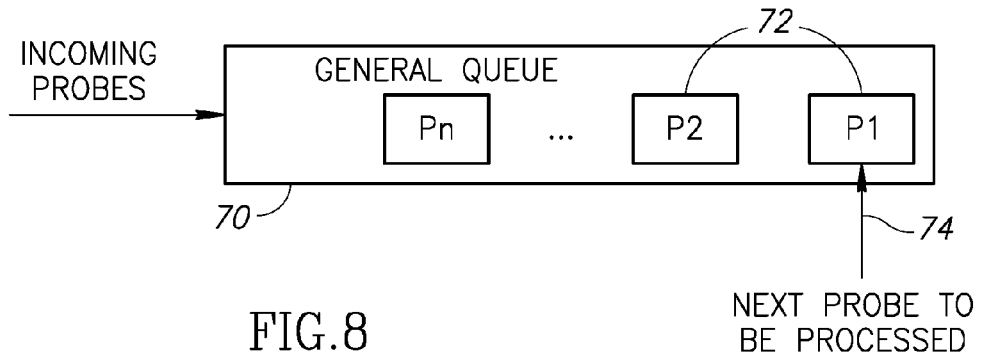
FIG. 8 is a diagram illustrating an example structure of a general queue of an agent.

A diagram illustrating an example structure of a general queue of an agent is shown in FIG. 8. The general queue, generally referenced 70, comprises one or more probes P1, P2, . . . , Pn 72. The arrow 74 indicates the next probe (P2) to be processed. In one embodiment, the default behavior is to process received probes in first-in first-out (FIFO) order but in other embodiments can be any order. This behavior, however, can be overridden by the task instructions of the agent. Note that a general probe queue can receive probes of any type.

Figure 9:
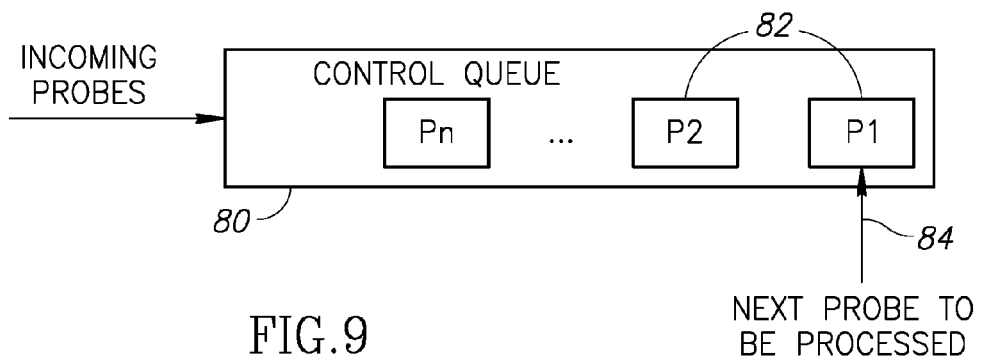
FIG. 9 is a diagram illustrating an example structure of a control queue of an agent.

A diagram illustrating an example structure of a control queue of an agent is shown in FIG. 9. The control queue, generally referenced 80, comprises one or more control probes P1, P2, . . . , Pn 82. The arrow 84 indicates the next probe (P2) to be processed. A control queue is a specialized queue used to receive and process instructions from the network control mechanism. In one embodiment, an agent comprises a control queue by default. In an alternative embodiment, agents may not have a control queue by default. Note that the control queue can only receive control probes issued by the control mechanism. Note also that agents can issue control probes based on the state of the primary network or interactions with other agents without directive or intervention from the control mechanism.

Figure 10:
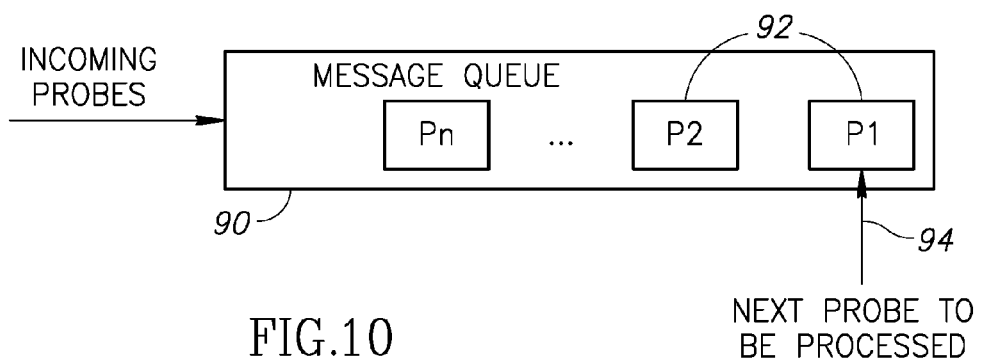
FIG. 10 is a diagram illustrating an example structure of a message queue of an agent.

A diagram illustrating an example structure of a message queue of an agent is shown in FIG. 10. The message queue, generally referenced 90, comprises one or more message probes P1, P2, . . . , Pn 92. The arrow 94 indicates the next probe (P2) to be processed. The message queue functions to receive message probes from the computing network.

Figure 11:
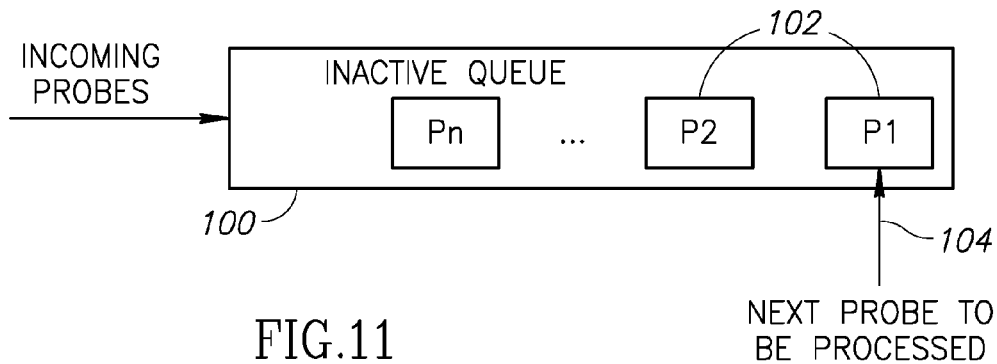
FIG. 11 is a diagram illustrating an example structure of an inactive queue of an agent.

A diagram illustrating an example structure of an inactive queue of an agent is shown in FIG. 11. The inactive queue, generally referenced 100, comprises one or more deactivated probes P1, P2, . . . , Pn 92. The arrow 104 indicates the next probe (P2) to be processed. The inactive queue is also a specialized queue. It is used to store probes that are deactivated by an agent. Probes in the inactive queue can be deactivated, reactivated or destroyed by an agent based on the state of the agent or by a directive issued from the control mechanism.

Regarding the queues shown in FIGS. 8, 9, 10 and 11, practically, the queues actually contain zero or more probes. In each Figure, a queue can be empty which may occur in the event the fitness function is tied to queues in a manner where if a queue remains empty for a specified time interval the agent task invokes special behavior. In another embodiment, an empty queue could similarly invoke behaviors on the host e.g., notify an operator that the agent is not receiving any probes.

A path, as defined supra, is the sequence of agents visited by a probe. Paths can be simple or complex depending on the configuration of the particular network. For example, paths can have cycles, terminate and branch or have any other combination of characteristics. Note that path branching is achieved by creating additional probes at the branch point. Several examples of different paths are presented below.

Figure 12:
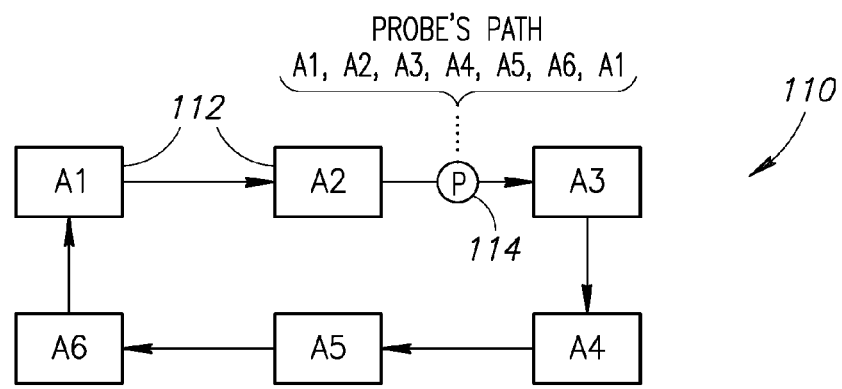
FIG. 12 is a diagram illustrating an example cyclic path for an agent.

A diagram illustrating an example cyclic path for an agent is shown in FIG. 12. The example cyclic path, generally referenced 110, comprises a plurality of agents A1, A2, A3, A4, A5, A6, A1 112 and an example probe 114 having a path A1, A2, A3, A4, A5, A6, A1. A cyclic path returns a probe to the first agent in its path list. The probe continues to follow this path until it is deactivated or destroyed by an agent.

Figure 13:
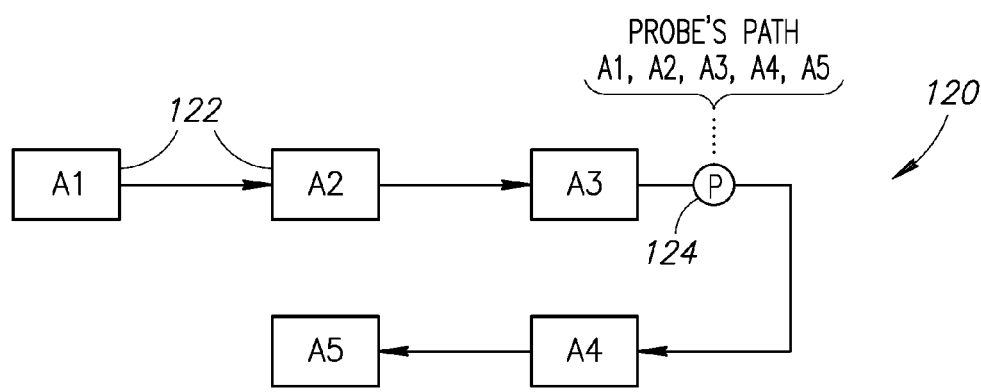
FIG. 13 is a diagram illustrating an example terminating path for an agent.

A diagram illustrating an example terminating path for an agent is shown in FIG. 13. The example terminating path, generally referenced 120, comprises a plurality of agents A1, A2, A3, A4, A5 122 and an example probe 124 having a path A1, A2, A3, A4, A5. A terminating path ends at the last agent in the path list. The probe is either destroyed, deactivated or returned to the control system for reassignment to a different part of the computing network.

Figure 14:
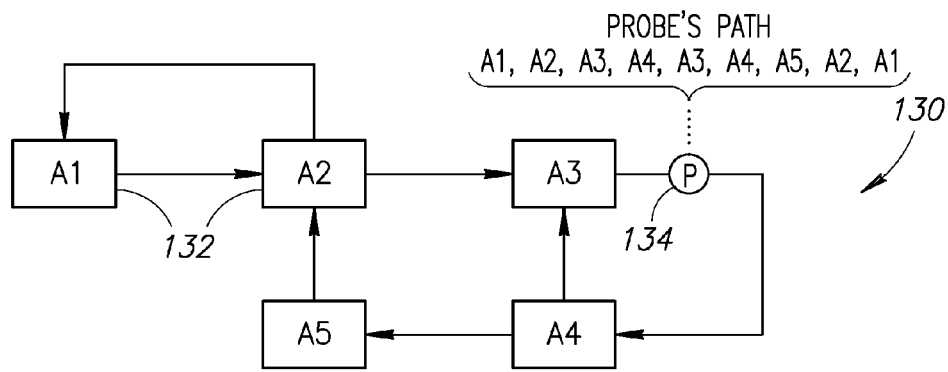
FIG. 14 is a diagram illustrating an example repeating/multiple cycle path for an agent.

A diagram illustrating an example repeating/multiple cycle path for an agent is shown in FIG. 14. The example repeating/multiple cycle path, generally referenced 130, comprises a plurality of agents A1, A2, A3, A4, A5 132 and an example probe 134 having a path A1, A2, A3, A4, A3, A4, A5, A2, A1. In one embodiment, a path can have repeating cycles and/or multiple cycles.

Figure 15:
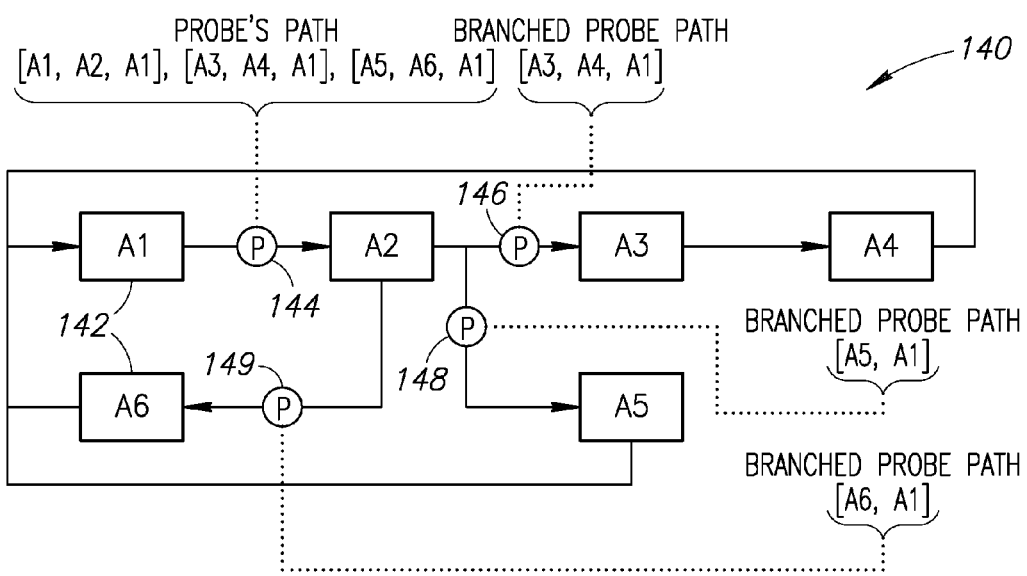
FIG. 15 is a diagram illustrating an example branched path for an agent.

A diagram illustrating an example branched path for an agent is shown in FIG. 15. The example branched path, generally referenced 140, comprises a plurality of agents A1, A2, A3, A4, A5 and A6 142, probe 144 having a composite path {[A1, A2, A1], [A3, A4, A1], [A5, A1], [A6, A]}, probe 146 having branched probe path [A3, A4, A1], probe 148 having branched probe path [A5, A1] and probe 149 having branched probe path [A6, A1]. Note that to make the notation clear whether these paths terminate or return home, the home agent is included as the final step in the path.

Figure 16:
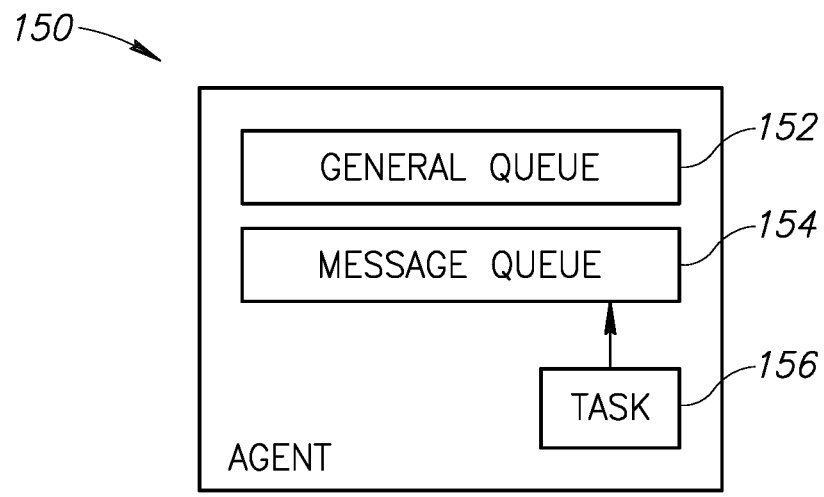
FIG. 16 is a diagram illustrating an example agent structure related to message passing.
Figure 17:
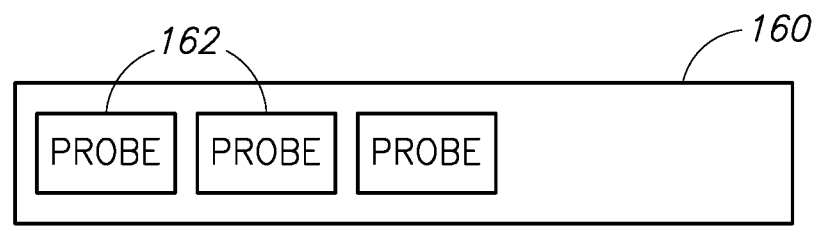
FIG. 17 is a diagram illustrating an example message queue related to message passing.

A diagram illustrating an example agent structure related to message passing is shown in FIG. 16. The agent, generally referenced 150, comprises a general queue 152, message queue 154 and task 156. A diagram illustrating an example message queue related to message passing is shown in FIG. 17. The message queue 160 comprises a plurality of probes 162 received from the network. In this message passing example, the probe has a type 'Message.' The probe payload comprises message ID, message, target ID and owner ID field.

In one embodiment, the message processing utilizes a message queue 154. In an alternative embodiment, the task 156 may contain instructions for processing typed probes using a single general queue. In this case, the separate message queue is not required for broadcasting and receiving messages. In general, agents are operative to perform at least one task. The task, however, could be a no-op (i.e. no operation) such as simply passing a probe to the next agent on the probe's path.

In the example embodiment presented herein, each agent has ownership of a single message probe. Alternative implementations may or may not require ownership of a message probe or may allow for ownership of a plurality of message probes.

Figure 18:
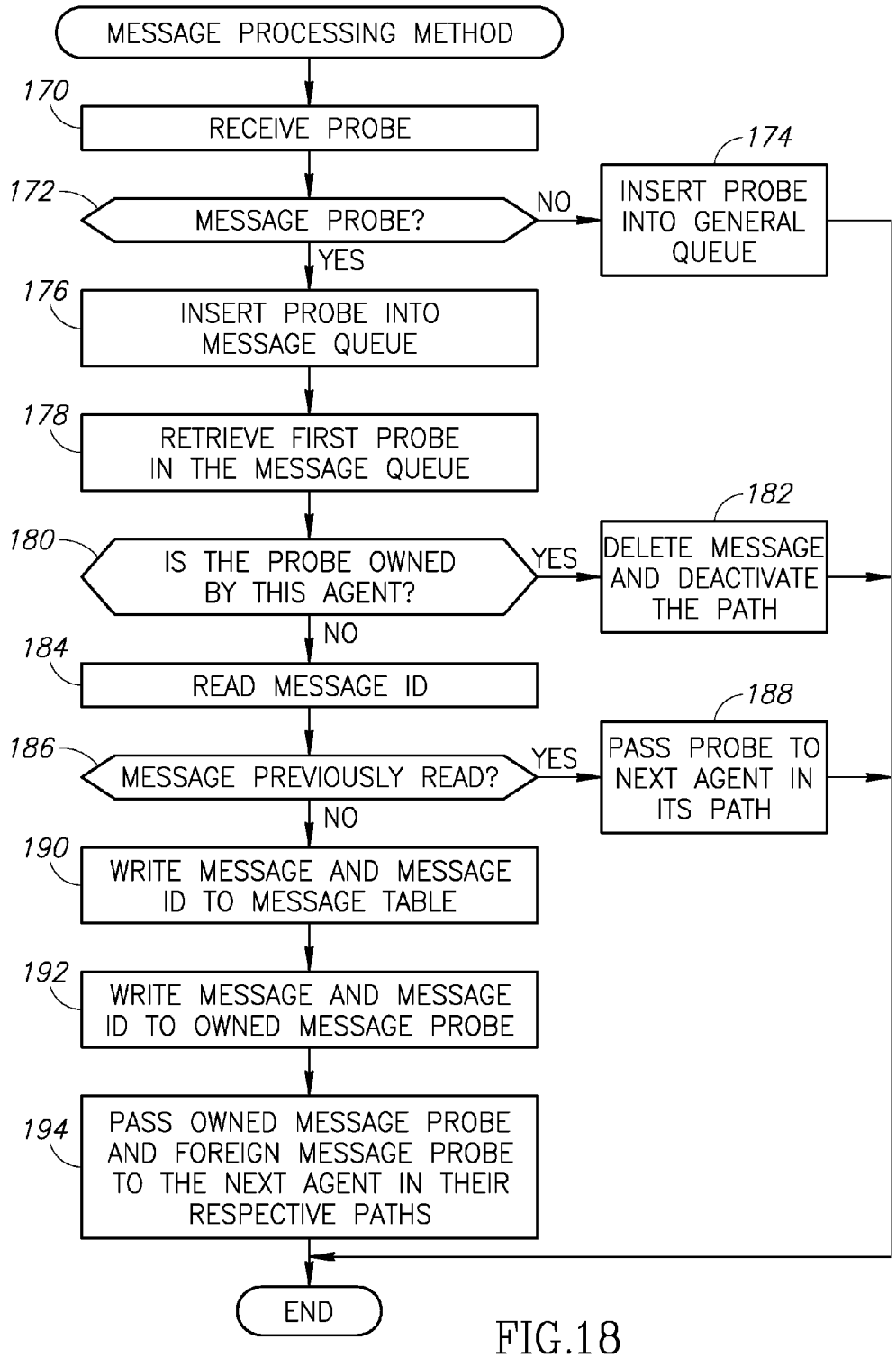
FIG. 18 is a flow diagram illustrating an example message processing method of the present invention.

A flow diagram illustrating an example message processing method of the present invention is shown in FIG. 18. Initially, a probe is first received from the network by an agent (step 170). If the probe is a message probe (step 172), it is inserted into the message queue (step 176). Otherwise the probe is inserted into the general queue (step 174). The first probe in the message is then retrieved (step 178). If the agent owns the received probe (step 180), the message is deleted and the probe is deactivated (step 182).

If the agent does not own the probe, then the agent then reads the message ID (step 184) and compares it to previously received messages (step 186). If the message has been previously received it passes the probe to the next agent in the probe's path (step 188). If the message has not been previously received, the message and the message ID is written to a message table (step 190). The message and message ID from the message table are then written to the agent's owned message probe (step 192). Both the foreign message probe and the owned message probe are dispatched to the agent in their respective probes' path (step 194).

Figure 19A:
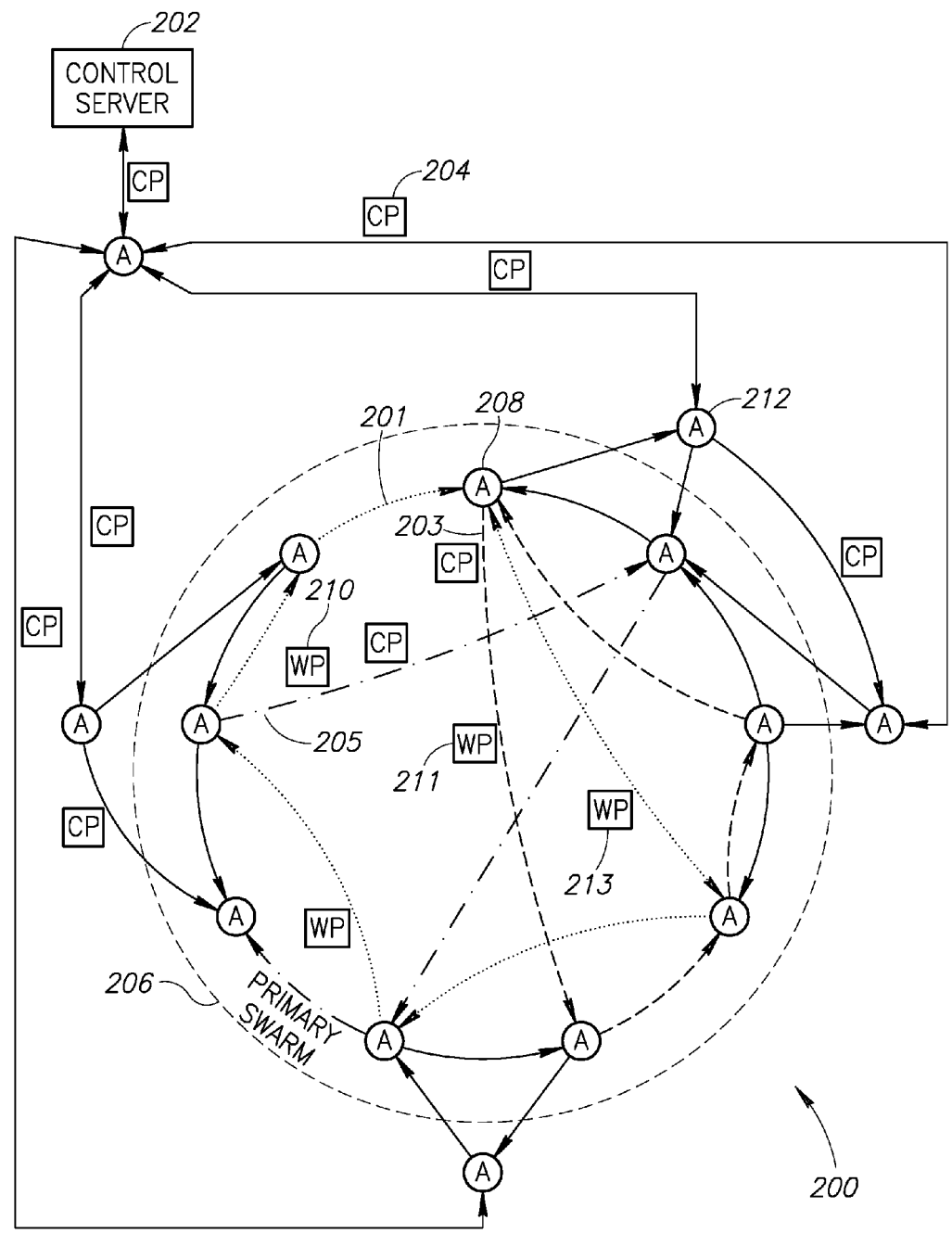
FIG. 19A is a diagram illustrating an example distributed computing system constructed in accordance with the present invention.

A diagram illustrating an example distributed computing system constructed in accordance with the present invention is shown in FIG. 19A. The example system, generally referenced 200, comprises a control mechanism 202 (e.g., control server), one or more agents (A) 208, one or more control probes (CP) 204 and one or more working probes (WP) 210. Note that the path of working probe 210 is represented by dashed-dotted arrows 205. Similarly, the path of working probe 211 is represented by dashed arrows 203. The path of working probe 213 is represented by dotted arrows 201.

In one embodiment, a distributed computing system comprises a minimum of a control server 202 and agents 208. The agents within dashed circle 206 are considered the primary computing network and function to execute the mandate or mission of the specific implementation of the computing network. The agents outside the dashed circle 206 are tasked to function as part of the control mechanism. The method for exerting control over the computing network includes the control server inserting control instructions to a control probe and the injecting the probe into the agent network. Note that in one embodiment, the top level control server or mechanism comprises multiple independent computers injecting control probes into different segments of agents. Recipient agents outside the dashed circle receive and process the injected control probes and pass them to the primary computing network inside the dashed circle. When a primary agent receives a control probe, it executes any relevant instructions contained in the probe, e.g., executing object code, compiling and then running source code, etc. Primary agents return data to the control server by inserting data into the payload of a control probe and injecting it into the network.

An agent is capable of receiving control probes and passing the control probes to the next agent in the path. An agent can modify a control probe issued from a control server or other agent or issue control probes based on the state of the primary computing network, its own state or the aggregate state of other agents that it interacts with.

In one embodiment, typed queues are a convenience for implementation. This allows programming to prioritize probe processing in different ways depending on the intent of the network. For example, an agent can be programmed to always process any control probes in the control queue before processing probes in the working queue. This could be accomplished in a single general queue, but it would require scanning the entire queue for control probes before processing a working probe that is at the head of the queue. Similarly, message queues could be prioritized over working queues. Alternatively, the queues could be processed by stepping through each queue type in sequence always processing the first probe in each queue. Again, this could be accomplished in a single queue but it would require scanning the queue for the desired probe type. It is possible that the type of probe being sought could reside at the tail of the queue forcing a scan of the entire queue to find it. If the queue is extremely large this could affect performance.

Figure 19B:
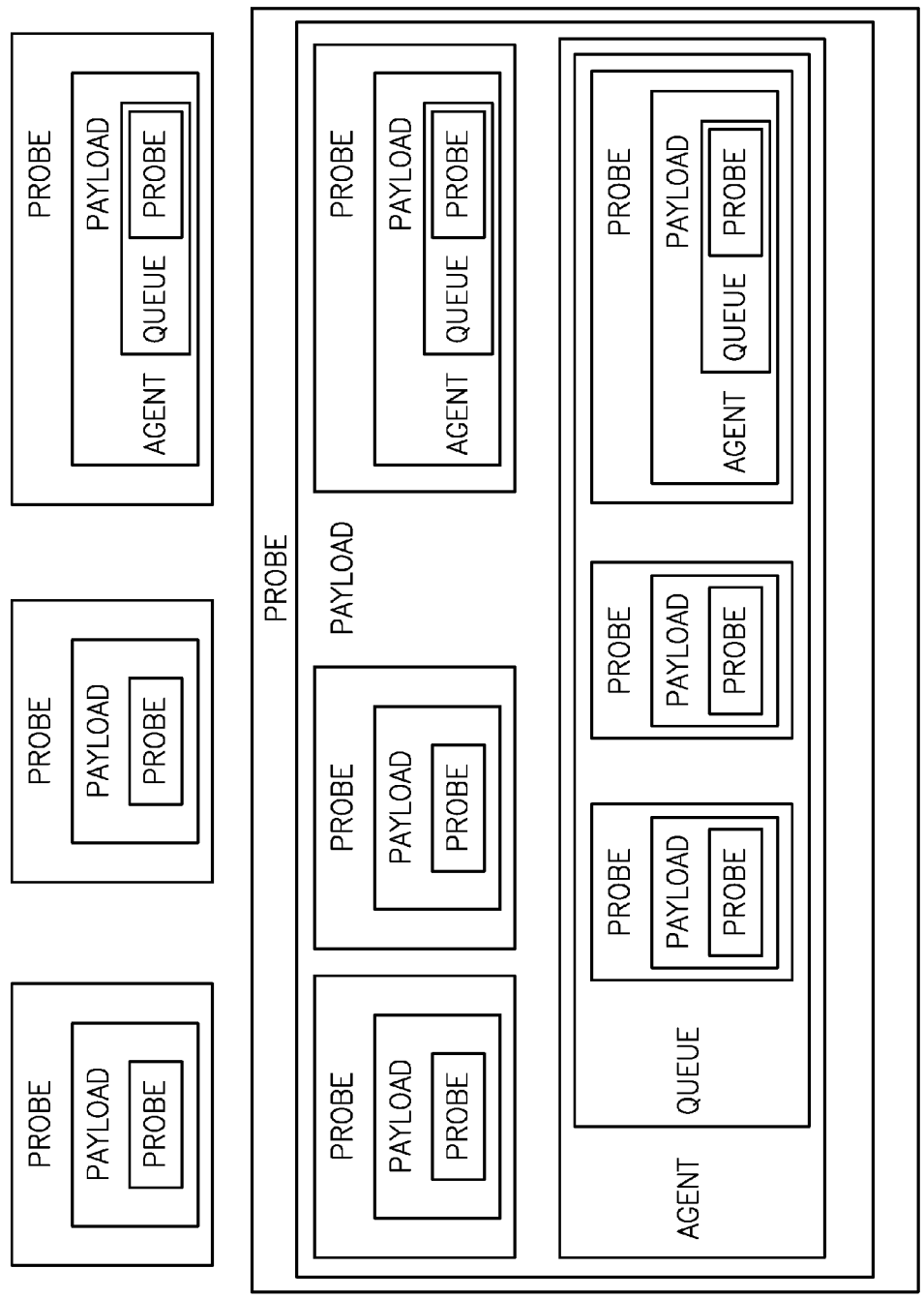
FIG. 19B is a diagram illustrating example recursive structures suitable for use in distributed computing system.

With reference to FIG. 19A, it is noted that the control example illustrated therein embodies a strongly hierarchical structure between agents and the control server. There is, however, nothing preventing the control server from being a network itself or the agent network structure not being a "flat layer." In addition, these structures can be recursive as shown in FIG. 19B. In this Figure, probes carrying payloads incorporating other probes or agents are illustrated as well as probes carrying probes carrying agents with queues containing probes carrying other probes or agents.

Figure 20:
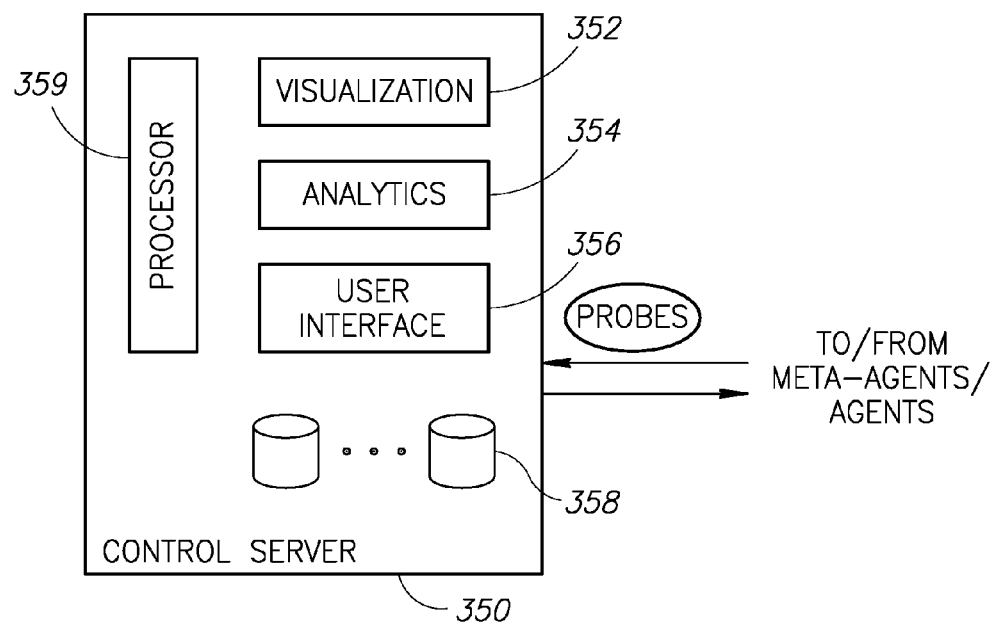
FIG. 20 is a diagram illustrating an example control server.

A diagram illustrating an example control server is shown in FIG. 20. The example control server, generally referenced 350, may comprise a general purpose computer such as shown and described in connection with FIG. 1. In one embodiment, the control server comprises a processor 359 and hosts the user interface 356, visualization code 352, analytics code 354 and the zero or more various databases 358 required to store the data collected by the primary computing network. Note that alternatively, the control server can be implemented without the use of a database internal to the control server. In this embodiment, what the computing network "knows" is embodied in the agents and probes themselves is retrieved by traversing the network. In general, however, a database is preferred even if it only used as a record of states and data, or as an integral part of agent tasks.

Regarding authentication and authorization, it is noted that in a "pure" (i.e. non-hostile) environment, there is no need for authentication and authorization. If an agent receives a control probe, it is not important for it to know where it came from. It could not have even received the probe unless some other part of the system knows where it is and sends it a control probe. This holds true for any probe type.

In a "non-pure" (i.e. potentially hostile), however, this is a different problem because the system must contend with attempts to inject counterfeit probes into the system, the attaching of counterfeit agents to a network and the hijacking of agents, segments of the network or even a complete takeover of an entire network by a bad actor.

Several well-known methods of authentication and authorization can be used with the distributed computing system of the present invention. For example, authentication and authorization can be implemented utilizing encrypted lists of agents that define what agents a particular agent is allowed to send control probes to. Alternatively, encrypted lists of agents on a primary agent that designate which agents are authorized to issue control probes can also be used. Similar lists of agents that authenticate a working probe are another alternative.

In another embodiment, authentication and authorization are implemented by each probe and agent containing a digital wallet with a single crypto-currency coin in it. These coins are issued using well-known block chain technology and are believed to be impossible to counterfeit. A probe only needs to exchange its coin with the agent that it is visiting. If both the agent and probe exchange valid coins, then the transaction is authorized. Preferably, the block chain is not managed publicly like Bit Coin, but privately behind a hardened firewall.

Figure 21:
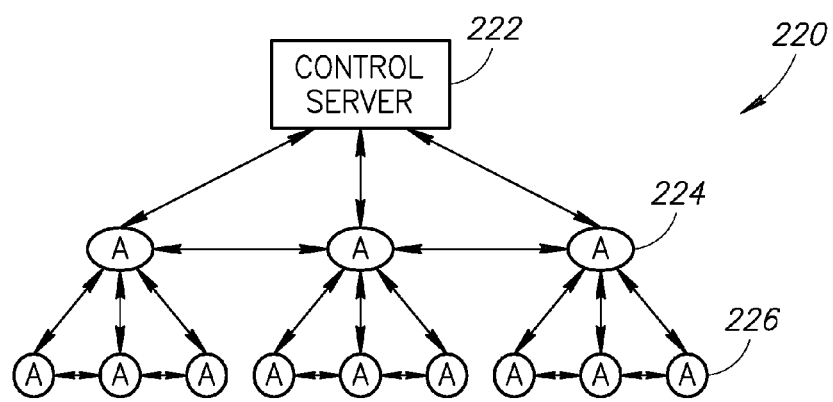
FIG. 21 is a diagram illustrating a hierarchical distributed computing system configuration.

A diagram illustrating an example hierarchical distributed computing system configuration is shown in FIG. 21. In this example distributed computing network, generally referenced 220, the control server 222, agents 224 and primary agents 226 are organized in hierarchical fashion. Typically, an operational network is hierarchical but this is not a requirement. Since probes may comprise agents within their payload and agents 224 function to provide control by designation only, many other configurations besides a hierarchical configuration are possible. An agent can both control other agents and be a primary agent, this being resolved by context in the particular implementation of the invention.

Figure 22:
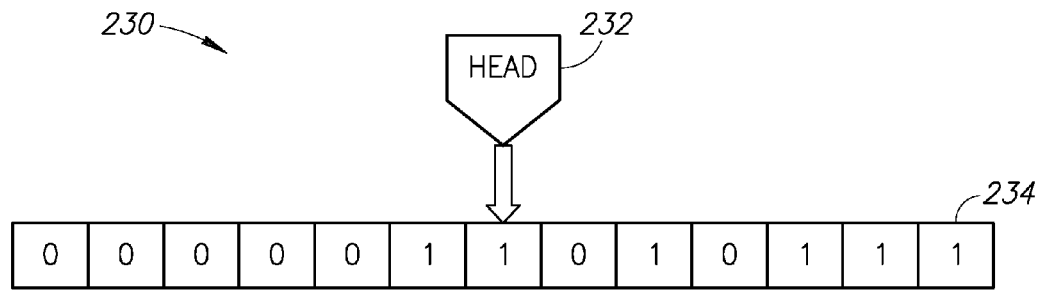
FIG. 22 is a diagram illustrating an example Turing machine.

A diagram illustrating an example Turing machine is shown in FIG. 22. As is well known to those skilled in the computer arts, a Turing machine is a computer science construct created by Alan Turing as a computation model and is a cornerstone of modern computers. A Turing machine 230 is defined as a read/write "head" 232 containing a program and a tape of symbols in individual cells 234. The head can read from a cell, write to a cell or move one cell left or right. The program contained within the head determines which action is to be taken.

Figure 23:
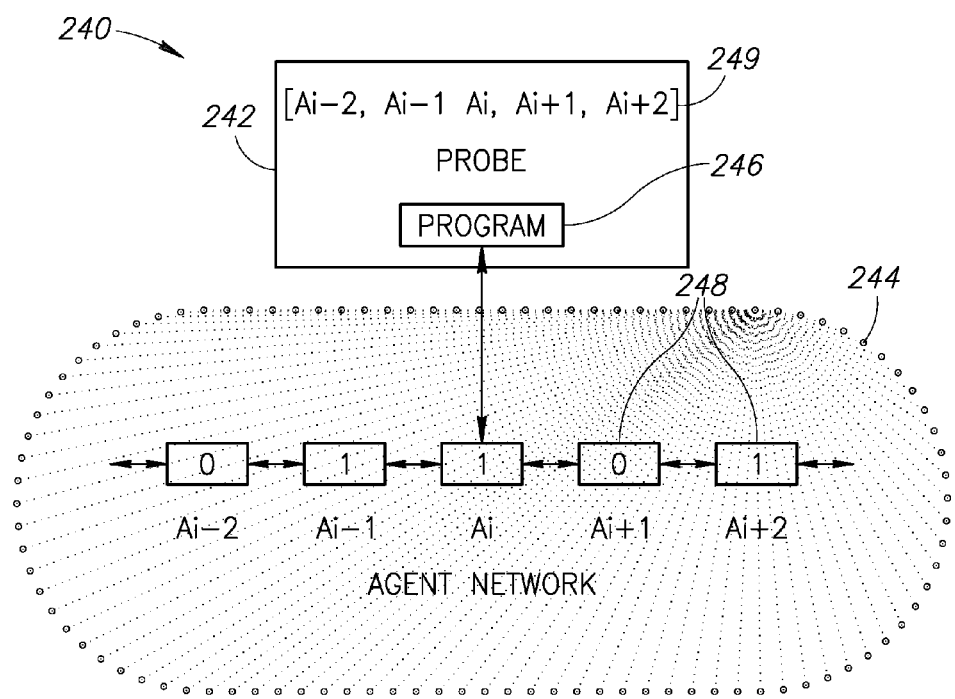
FIG. 23 is a diagram illustrating an example Turing machine constructed from agents and probes of the present invention.

A diagram illustrating an example Turing machine constructed from agents and probes of the resent invention is shown in FIG. 23. The example system, generally referenced 240, comprises at least one probe 242 and an agent network 244. The agent network based network system of the present invention is capable of emulating a Turing machine and can thus be configured to function as a general computing system.

The system of agents and probes of the present invention can be configured, for example as shown in FIG. 23, to operate as a Turning machine by viewing a probe as the machine head and the agents on 248 the probe's path 249 as the cells of the tape. The payload 246 of the probe comprises the executable code (i.e. the program of the Turing machine) and each agent in the path comprises the symbol as its fitness metric. The probe reads the fitness metric, writes to the fitness metric, moves to the next agent in its path or moves to the previous agent in its path Emulation of Deterministic Logic Circuits As described supra, the distributed computing network mechanism of the present invention is capable of establishing self evolving, self organizing networks that change dynamically over time by use of agents and probes. In addition, the distributed computing network mechanism of the present invention is capable of generating strictly deterministic logic circuits as well. An advantage of the mechanism of the invention is its ability to create self organizing capabilities while embedding deterministic logic circuits into the system.

Figure 24:
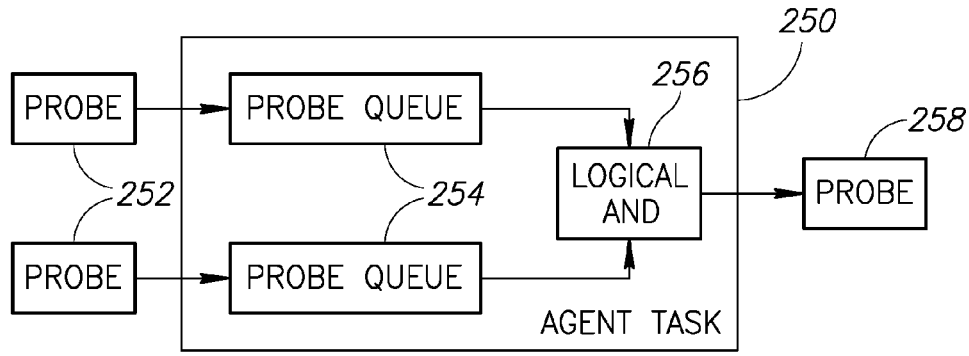
FIG. 24 is a diagram illustrating a first example of logical AND emulation utilizing agents and probes of the present invention.

A diagram illustrating a first example of logical AND emulation utilizing agents and probes of the present invention is shown in FIG. 24. The example agent 250 comprises two probe queues 254 and agent task 256 that implements the logical AND function. In operation, the agent receives two probes 252 and stores them in separate queues. If one of the queues is empty, the agent waits to receive a probe in the empty queue. The probe payload may comprise either '0' or '1'. The agent task reads the payload of each probe, performs the logical operation, destroys the two probes, creates a new probe and path, writes the result to the new probe payload and dispatches the new probe 258 to the network.

Figure 25:
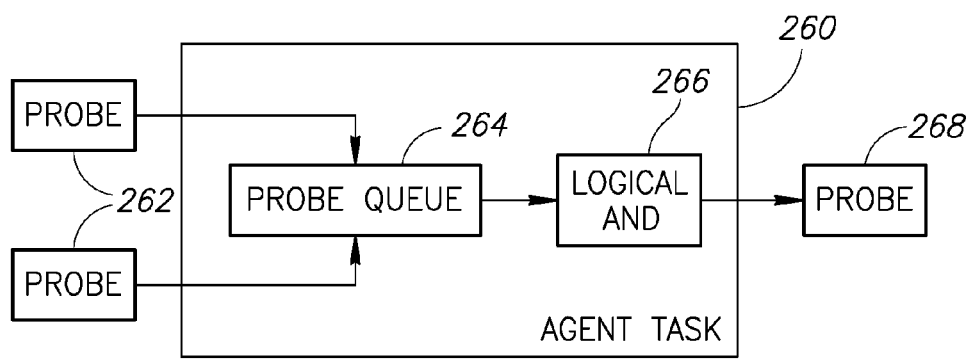
FIG. 25 is a diagram illustrating a second example of logical AND emulation utilizing agents and probes of the present invention.

A diagram illustrating a second example of logical AND emulation utilizing agents and probes of the present invention is shown in FIG. 25. The example agent 260 comprises one probe queue 264 and agent task 266 that implements the logical AND function. In operation, the agent receives two probes 262 and stores them in the single queue. If more than two probes are in the queue, only the first two are processed. If only one probe is in the queue, the agent waits for a second probe to arrive. The probe payload may comprise either '0' or '1'. The agent task reads the payload of each probe, performs the logical operation, destroys the two probes, creates a new probe and path, writes the result to the new probe payload and dispatches the new probe 268 to the network.

Figure 26:
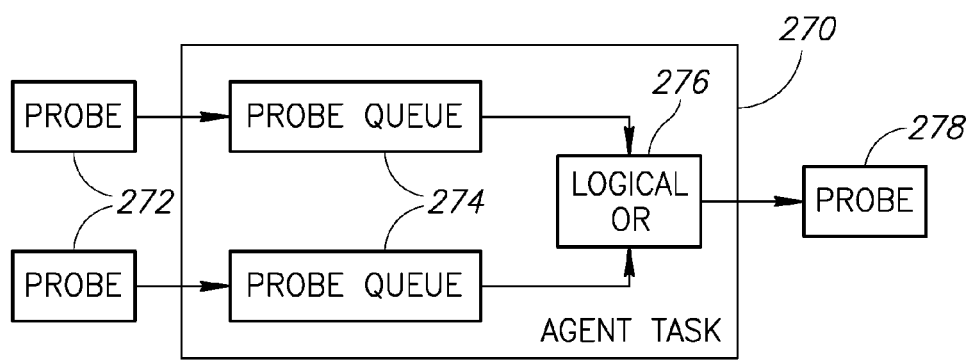
FIG. 26 is a diagram illustrating a first example of logical OR emulation utilizing agents and probes of the present invention.

A diagram illustrating a first example of logical OR emulation utilizing agents and probes of the present invention is shown in FIG. 26. The example agent 270 comprises two probe queues 274 and agent task 276 that implements the logical OR function. In operation, the agent receives two probes 272 and stores them in separate queues. If one of the queues is empty, the agent waits to receive a probe in the empty queue. The probe payload may comprise either '0' or '1'. The agent task reads the payload of each probe, performs the logical operation, destroys the two probes, creates a new probe and path, writes the result to the new probe payload and dispatches the new probe 278 to the network.

Figure 27:
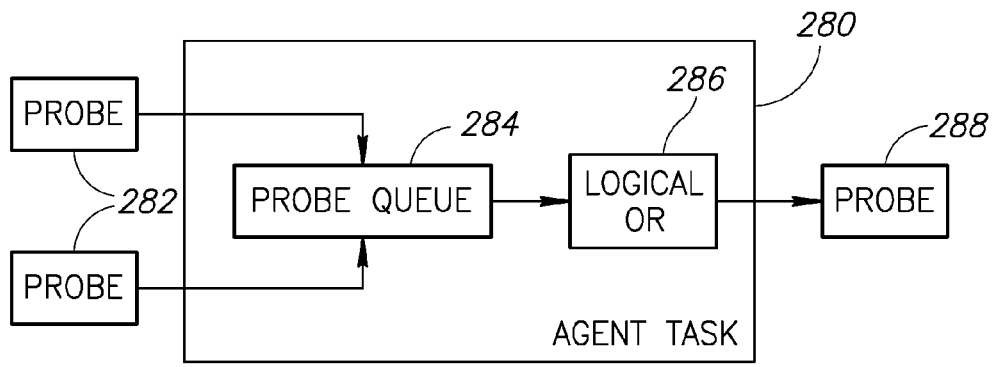
FIG. 27 is a diagram illustrating a second example of logical OR emulation utilizing agents and probes of the present invention.

A diagram illustrating a second example of logical OR emulation utilizing agents and probes of the present invention is shown in FIG. 27. The example agent 280 comprises one probe queue 284 and agent task 286 that implements the logical OR function. In operation, the agent receives two probes 282 and stores them in the single queue. If more than two probes are in the queue, only the first two are processed. If only one probe is in the queue, the agent waits for a second probe to arrive. The probe payload may comprise either '0' or '1'. The agent task reads the payload of each probe, performs the logical operation, destroys the two probes, creates a new probe and path, writes the result to the new probe payload and dispatches the new probe 288 to the network.

Figure 28:
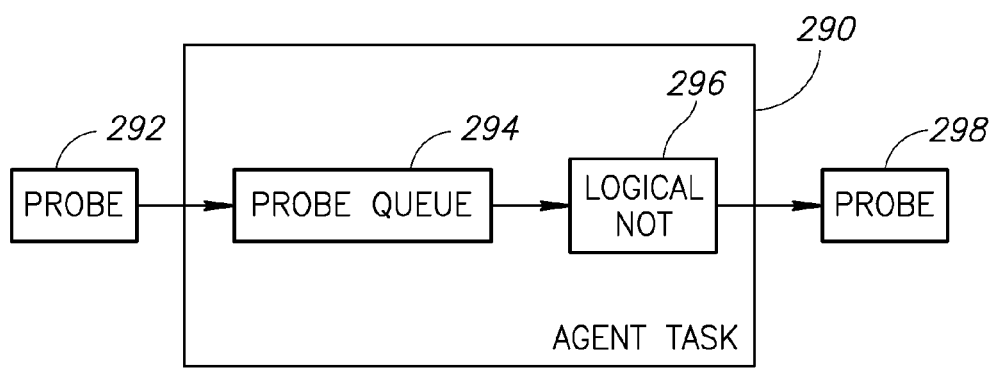
FIG. 28 is a diagram illustrating an example of logical NOT emulation utilizing agents and probes of the present invention.

A diagram illustrating an example of logical NOT emulation utilizing agents and probes of the present invention is shown in FIG. 28. The example agent 290 comprises one probe queue 294 and agent task 296 that implements the logical NOT function. In operation, the agent receives a probe and stores it in a single probe queue. The probe payload may comprise either '0' or '1'. The agent task reads the payload of the probe, performs the logical NOT operation, destroys the probe, creates a new probe and path, writes the result to the new probe payload and dispatches the new probe 298 to the network.

Note that since the distributed computing mechanism of the present invent is capable of modeling logic gates, it is also capable of modeling any combination of logic gates. Therefore, a large enough network of agents can model any arbitrary collection of logic gates including but not limited to digital circuits, digital memory, registers, processors, instruction queues, etc. Further, a complete Von Neumann architecture or any other computer architecture can be modeled using the distributed computing mechanism of the present invention.

Figure 29:
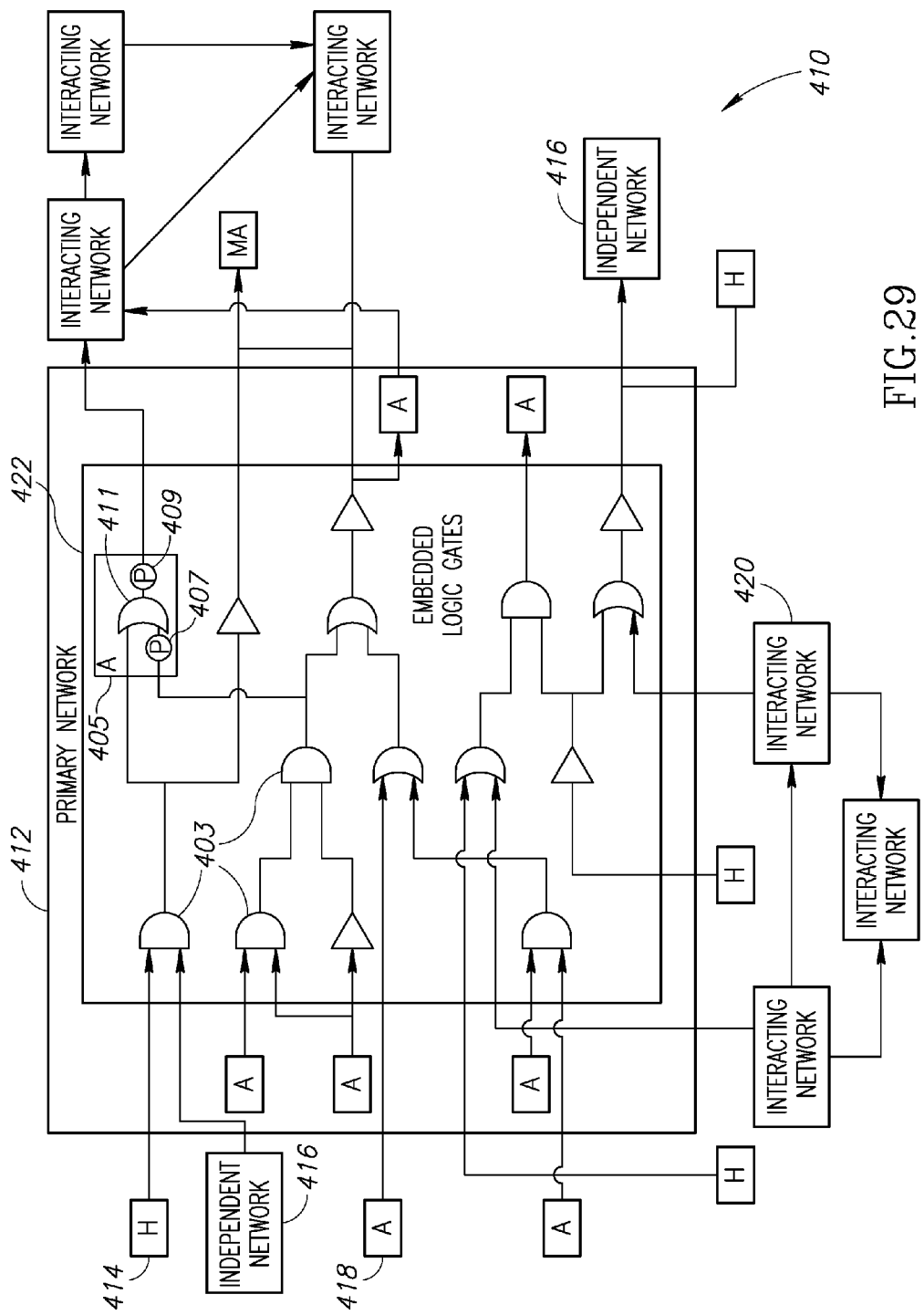
FIG. 29 is a diagram illustrating an example agent network configured to emulate digital logic circuits.

A diagram illustrating an example computing network configured to emulate digital logic circuits is shown in FIG. 29. The example distributed computing system, generally referenced 410, comprises a primary computing network 412 configured to emulate embedded logic circuits (i.e. primary network) 422, hosts 414, agents 418, independent networks 416 and interacting computing networks 420. In one embodiment, the logic gates of the primary network 422 are implemented by agents. The structure of an example agent 405 is shown comprising one or more probes 407 that provide the input to the emulated logic gate ('or' gate 411 in this example). The output of the gate is a probe 409 that is transmitted to another agent or network. Note that input probes may be received on none, one or both "inputs" of the logic gate in each agent.

Application of Distributed Computing Networks to Neural Networks

Figure 30:
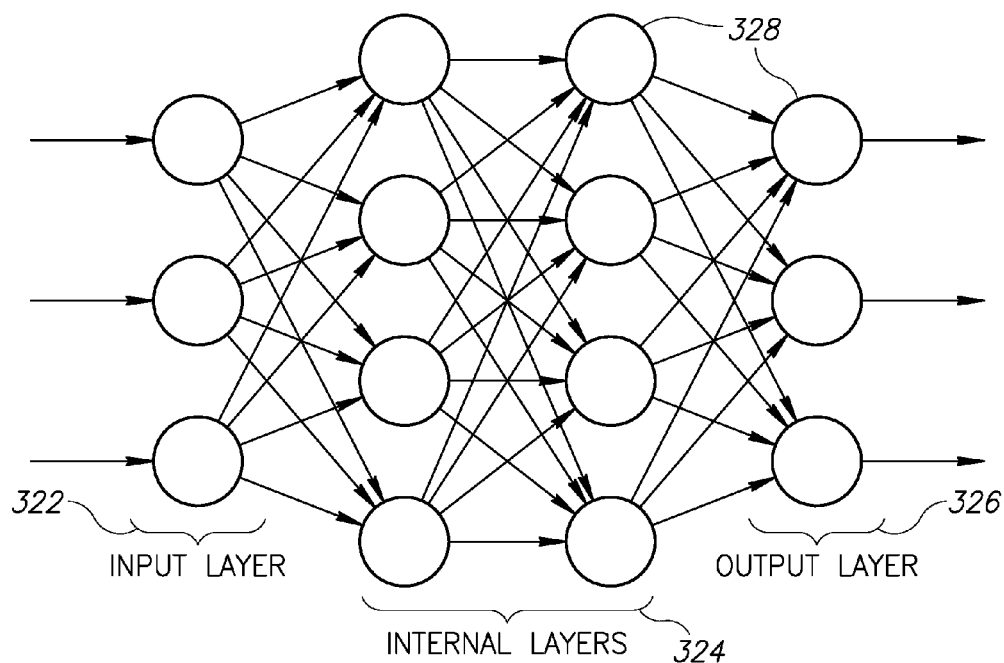
FIG. 30 is a diagram illustrating a first example of a neural network.

A diagram illustrating a first example of a neural network is shown in FIG. 30. The network, generally referenced 320, comprises a plurality of nodes 328 including an input layer 322, one or more internal layers 324 and an output layer 326.

Figure 31:
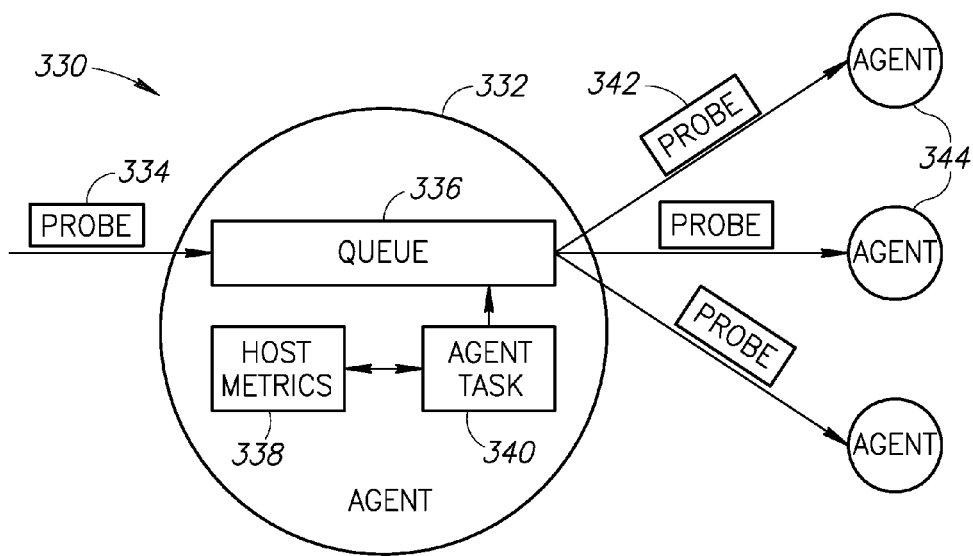
FIG. 31 is a diagram illustrating a second example of a neural network constructed utilizing agents and probes of the present invention.

A diagram illustrating a second example of a neural network constructed utilizing agents and probes of the present invention is shown in FIG. 31. The example neural network, generally referenced 330, comprises input probes 334, output probes 342 dispatched to one or more agents 344, an agent 332 including a queue 336, host metrics 338 and agent task 340. In operation, the host metrics 338 contain a table of weights for each connection to the next layer in the neural network. In one embodiment, the agent task 340 functions to read the weights from the host metrics, destroy the incoming probe and create a new probe for each agent in the next neural layer. The payload of each new probe has the weighting applied to the payload of the input probe.

It is noted that an advantage of creating a neural network using the distributed computing mechanism of the present invention is the ability to inject new behavior via control probes. This turns a static neural network into one that is adaptive and dynamic. A neural network can be initialized and trained using well known techniques then embedded into a computing network of the present invention. As the data throughput evolves, as occurs in the real world, the original neural network is able to evolve with it.

Example Distributed Computing Network

Figure 32:
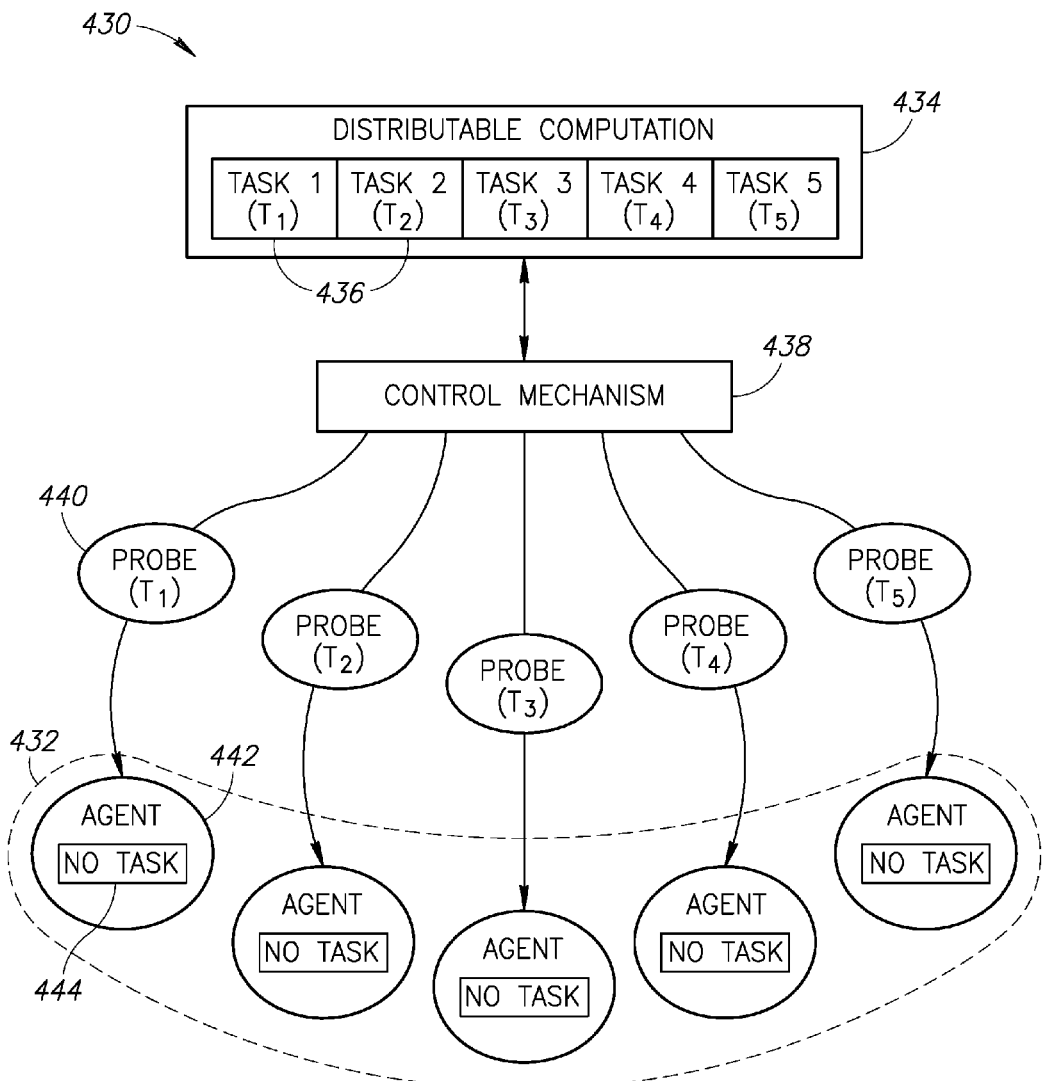
FIG. 32 is a diagram illustrating an example breakdown of a computation and distribution of tasks to agents in a path.

A diagram illustrating an example breakdown of a computation and distribution of tasks to agents in a path is shown in FIG. 32. The example network, generally referenced 430, comprises a plurality of agents 442 implemented on host computing devices and a control mechanism 438. A distributable computation 434 is broken down using well-known distributed computing techniques into a plurality of tasks 436. In this example, the computation is broken down into four tasks, namely Tasks 1-4 or $T_{1-4}$. A fifth task (Task $T_5$) is assigned to an agent and is responsible for assembling the results of the four computational tasks $T_{1-4}$. These tasks are distributed by the control mechanism to the agents that are located in the particular defined ordered path 432 via probes 440. In this example, each probe delivers a particular task to its corresponding agent. Initially, the agents 442 are not configured with the task yet as indicated by the 'No Task' block 444 in each agent in the path.

Figure 33:
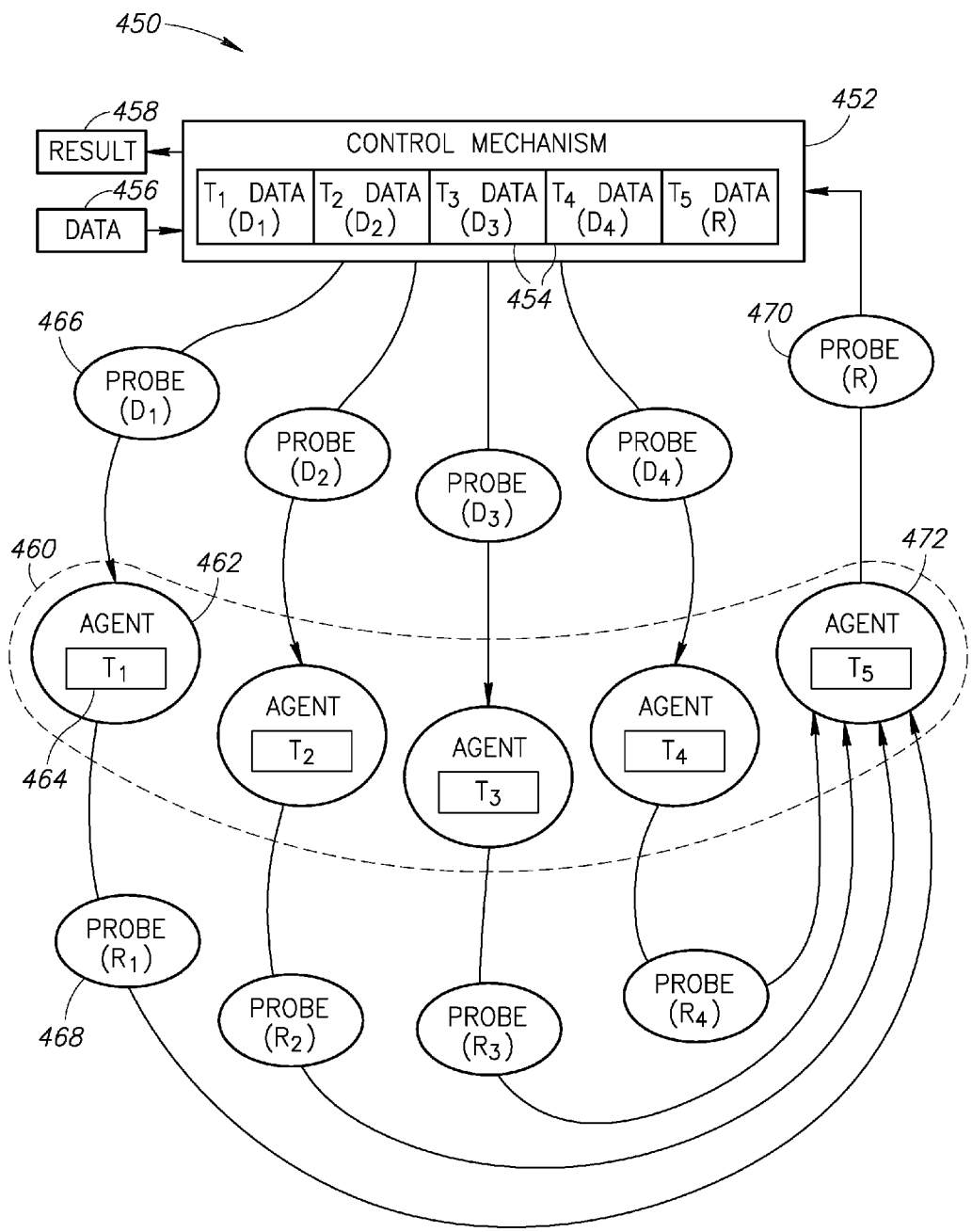
FIG. 33 is a diagram illustrating an example performance of a computation by the agents in a path.

A diagram illustrating an example performance of a computation by the agents in a path is shown in FIG. 33. Once the agents 462 in the defined ordered path 460 are configured with their respective tasks $T_{1-5}$, the computation can be performed. In this example, the data 456 for the computation is provided to the control mechanism 452. This, however, is not the only way the agents acquire data as one skilled in the art can contemplate numerous other ways for agents to acquire data. For example, one or more agents may acquire their own data or acquire it from an external source other than the control mechanism. The data 456 is broken own for each individual task by the control mechanism. The apportioned data 454 for the computation is sent to the agents via probes 466. Data earmarked for each task is sent via probe to the respective agent. For example, data $D_1$ for task $T_1$ is delivered to agent implementing task $T_1$ via probe ($D_1$). Data for the agents implementing task $T_{2-4}$ are delivered to their respective agents via corresponding probes in similar fashion. Note that in this example, the control mechanism does not send any data via a probe to agent 472.

Once their respective data is received by the agents, the computation is performed by executing the particular task previously loaded into each respective agent. Task $T_5$ in agent 472 is configured to take the results $R_{1-4}$ and generate a final result R for the entire computation that is then sent to the control mechanism for output as result 458 to another process.

Figure 34:
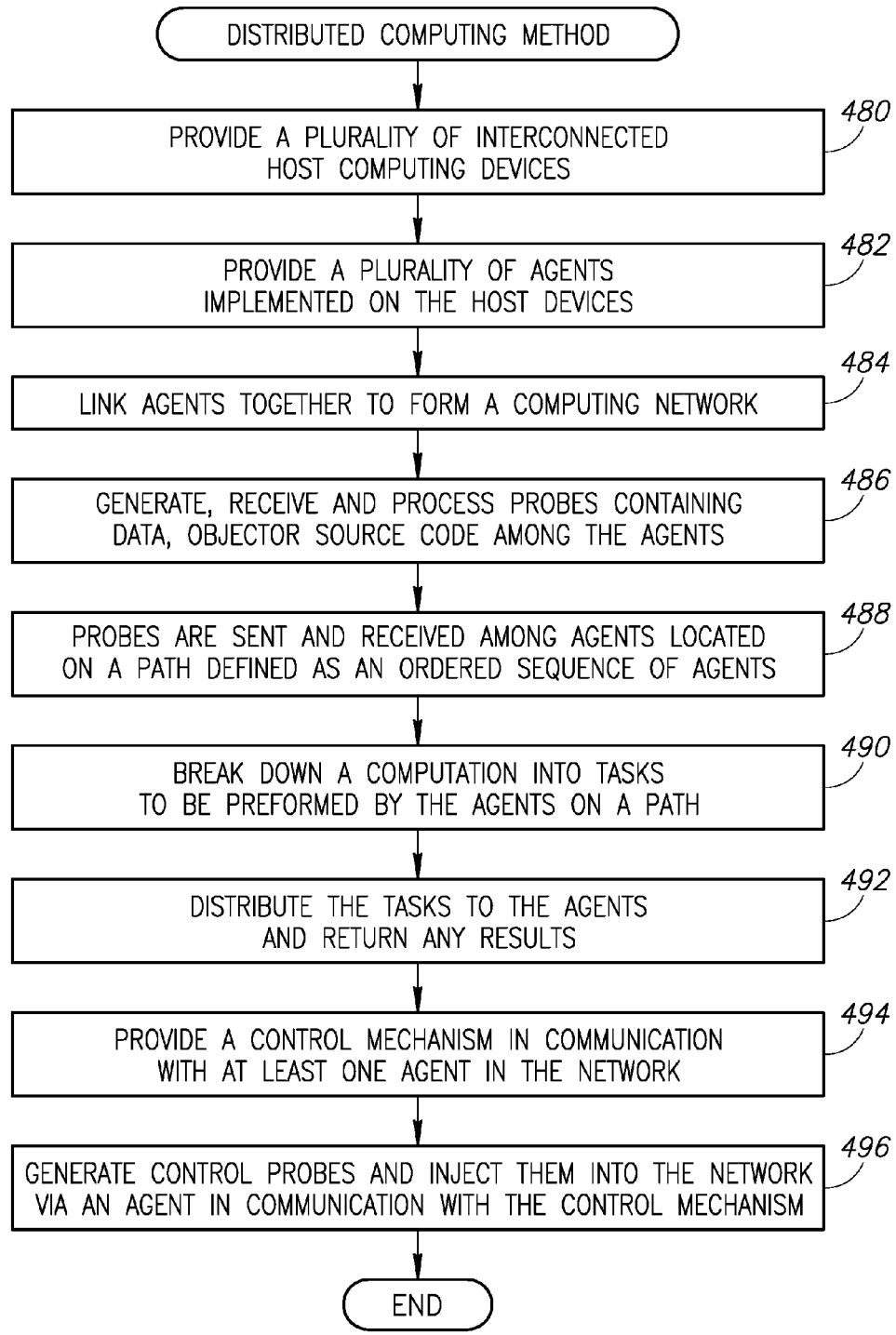
FIG. 34 is a flow diagram illustrating an example method of distributing computing.

A flow diagram illustrating an example method of distributing computing is shown in FIG. 34. A plurality of interconnected host computing devices are provided (step 480). A plurality of agents are provided whereby each agent is implemented on a host computing device (step 482). Agents are linked together to form a distributed computing network (step 484). The agents generate, receive and process probes which contain data, object and/or source code (step 486). The probes are sent and received only amongst the agents located on a path which is defined as an ordered sequence of agents (step 488).

A computation is the broken down into multiple tasks to be performed by the agents on a path (step 490). The tasks are distributed to the agents on the path and these agents execute their respective task(s) and generate one or more results. The results denoted (R) are returned via a probe(s) to a suitable entity such as a control mechanism, a selected agent in the path or a device external to the path or to the network (step 492).

A control mechanism is provided that is in communication with at least one agent in the network (step 494). Control probes are generated by the control mechanism and injected into the network via an agent that is in communication with the control mechanism (step 496).

Example Distributed Computing System

Listing 1 presented hereinbelow is a pseudo-code listing of an example distributed computing system constructed in accordance with the present invention. This pseudo-code can be used in a system that initializes probes and agents, passes probes through the network on randomized paths and applies stress to the system by degrading performance of individual agents. In this example system, the concept of Fitness Metric and Fitness Function is embodied simply as "Stress". Host Metrics are implicit as transit times of agents through the network and not an explicit values extracted from the host. The system as constructed by the inventor is a single instance software application in a synchronous, single threaded mode. The system was written is in Java and as such the pseudo-code in Listing 1 reflects the object oriented structure of that language. There are three classes in the following listing:

1. AgentManager: This class implements the control system. In a full implementation this would be replaced by a control server or servers, another computational network, or one or more other components.

2. Agent: This agent has a single general queue that process all probes in FIFO order.

3. Probe: There are no typed probes in this example pseudo-code listing. There are no message probes or control probes. All probes are considered working probes and as such the pseudo-code does not contain a "Type" field. Probe ownership is designated by an AgentID field on each probe.

Note that the terminology used in this example pseudo-code listing differs slightly from that used supra. For clarity, wherever the word "stress" appears in the listing below it is meant to refer to "fitness". Stress is introduced into the network (i.e. fitness reduced) by degrading the throughput of individual agents. As stress increases (i.e. fitness decreases) the rate at which an agent dispatches probes is reduced. Probes are "docked" and "launched" (i.e. received and dispatched). For simplicity, probes generate their own path. This does not reflect how the specification is written as it assumes knowledge of the network that in practice cannot be assumed. In a full implementation of the computational system, the probe would have its path assigned by the control mechanism. In general, mixed case refers to a member or function in the class while ALL CAPS is pseudo-code and may or may not refer to an actual field or function in a class. Comments are italicized and follow a double slash or are delineated with /** . . . */. Data types are not specified nor are return values.

Listing 1: Example Distributed Computing System Pseudo-Code

```
class AgentManager
Fields:
    Agents;                //Array of Agents
    DegradedAgents         //IDs of any agent degraded by the manager
    AgentCount             //Agents in the current simulation
    DegradeCount           // number of degraded agents
    DegradePercent         //degree of degradation
    StressRate             //How fast stress accumulates
    Stress Cap             //Stress level at which agent locks up and stops processing
probes
    MemoryDepth            // How much the agent "remembers" about its owned probe
    PathDepth              //Steps a probe takes before returning home
    CurrentCycle=0         //A cycle is a single pass through the agent array
    Total Cycles=0         // Number of cycles run in the current simulation
    Total Steps=0          //
Methods:
    GetAgentCount( )
    GetDegrade Count( )
    GetDegradeP ercent( )
    GetDegradedAgents( )
    GetStressRate( )
    GetStressCap( )
    GetMemoryDepth( )
    GetPathDepth( )
    SetAgentCount( )
    SetDegradeCount( )
    SetDegradePercent( )
    SetStressRate( )
    SetStressCap( )
    SetMemoryDepth( )
    SetPathDepth( )
/**
* Create and initialize a list of agents
*/
InitAgents( )
    WHILE (AGENTS < AgentCount)
        CREATE NEW AGENT
        ADD AGENT TO LIST
/**
* Degrades performance of random agents
* Degraded agents are stored in a list so they can be restored.
```

| Listing 1: Example Distributed Computing System Pseudo-Code |
| --- |

```
*/
DegradeAgents( )
    DEGRADE RANDOM AGENT BY DegradePercent
    ADD DEGRADED AGENT TO LIST
/**
* Restores degraded agents to original performance values
*/
RestoreDegradedAgents( )
    WHILE DEGRADED LIST NOT EMPTY
        RESTORE NEXT AGENT
        REMOVE AGENT FROM LIST
}
/**
* Iterates the Agents, launching probes, setting and retrieving values
*/
public void Run Cycle
    WHILE CYLES LEFT TO RUN
        ITERATE AGENT LIST AND ISSUE LAUNCH PROBE COMMAND
class Agent
Fields:
    AgentID
    StressRate              // How fast stress builds if probe doesn't return
    StressLevel             // 1 is no stress. No upper limit
    StressCap               // Level where stress shuts down launches
    MemoryDepth             // how far back the agent looks
    Memory                  // holds the amount of cycles since the last time
                            // the agent's own probe was launched.
    MemoryValue             // Average value of memory elements. Used to calculate
stress
    ProbeDepth              // Number of hops in a probe path
    ProbeRange              // How far a probe can go
    Degradation             // amount performance degradation
    AgentProbe              // the probe belonging to this agent
    LaunchDelay             // Delays a launch by this many cycles. This is what gets
degraded
    CyclesSinceLastLaunch   // counter used in launch delays
    CycleOwnLaunched        // Cycle this agent's probe was last launched
    CyclesSinceOwnLaunched  // Number of Cycles since this agent's probe was last
launched;
    CurrentCycle            //
    ProbeQueue              // untyped queue for probes
    ProbeHome               //Indicates if the probe owned by the is home or in transit
    CycleArrived;           //Cycle the agents probe arrived back home
Methods
    GetAgentID( )
    GetStresRate( )
    GetStressLevel( )
    GetStressCap( )
    GetMemoryDepth( )
    GetMemory( )
    GetMemoryValue( )
    GetProbeDepth( )
    GetProbeRange( )
    GetDegradation( )
    GetProbe( )
    GetProbeQueue( )
    GetLaunchDelay( )
    GetCyclesSinceLastLaunch( )
    GetCycleOwnLaunched( )
    GetCyclesSinceOwnLaunched( )
    GetProbePath( )
/**
* Agent constructor
*/
Agent( )
    SET FIELD VALUES
    CREATE OWNED PROBE
    INITIALIZE MEMORY
/**
* Launches the current probe in the Agent's queue. If no probe is in the
* queue, null is returner, In a parallel, asynchronous implementation,
* the agent can launch according to it's own internal settings.
*For this simulation it is controlled by the Agent Manager and is
* called once ewly cycle.
*
* A probe is launched only if there is one in the queue and these
* conditions are met:
```

| Listing 1: Example Distributed Computing System Pseudo-Code |
| --- |

```
*   1) It has been in the queue for a full cycle. This prewnts the
*      Agent Manager from inserting a probe earlier in a cycle and then
*      in the same cycle getting to the agent and launching it again. A
*      Probe can only mow once per cycle in the simulation.
*   2) The Stress level cap has not been reached. All launches stop
*      once this lewl is breached. They resume if the stress lewl
*      drops below the cap.
*   3) If the degradation level is more than 0, then an agent will hold
*      a probe for some number of cycles.
*/
LaunchProbe( )
   UPDATE ALL VALUES RELATING TO CYCLES
   IF LaunchApproved( )
         IF PROBE IS OWNED BY AGENT THEN UPDATE OWENED
      PROBE STATE
         LAUNCH PROBE
/**
* Receiws a probe from the Agent Manager - Docks the probe
*
* A probe isn't "home" until it is at the head of the queue
* and being launched - This keeps the calculations for this
* simulation consistent
*/
DockProbe( )
   SET PROBE LOCATION
   ADD PROBE TO QUEUE
   IF HEAD OF QUE IS OWNED PROBE
         UPDATE PROBE STATE AND AGENT
/**
* Sets stress level to "no stress"
*/
ResetStress( )
/**
* For this simulator stress needs to be calculated on every cycle. In an
* asynchronous implementation, the agent will haw to recalculate stress
* based on an internal timer or some other regular ewnt. For this prototype
* stress increases when the probe owned by the agent does not return within some
* allowed variance of cycles from the awrage return times "remembered"
* by the agent. This simulator uses the LaunchProbe command to trigger a
* recalculation of the stress based on the fact that the agent manager
* tells the agent to launch probe once emy cycle. A real world implementation
* would not likely tie the stress calculation to a launch ewnt.
*/
CalculateStress( )
   /** MemotyValue is the awrage transit time of the probe. If the probe
    has not returned within this average plus a stress factor, the stress
    goes up. If the stress is elevated and the probe returns within the
    allotted time, the stress does not reset to zero but rather decreases
    incrementally. As the stress lewl increases, the launch delay is
    increased. This propagates the stress through the rest of the
    network. Once the stress cap is reached, further launches are halted.
    If the stress cap is reached, it will stay elevated, or perhaps
    increase further. Once the probe returns, the stress will decrease
    incrementally until launches resume.
    */
   IF OWNED PROBE IN TRANSIT
         APPLY STRESS CALCULATION TO MEMORY VALUE
ReduceStress( )
   IF OWNED PROBE AT HEAD OF QUEUE
         APPLY STRESS REDUCTION FORMULA
/**
* A launch is approwd depending on the stress lewl As the stress level
* goes up launches are delayed until the tress cap is reached. Once that
* cap is reached launches are halted.
*/
LaunchApproved( )
   IF StressLevel LESS THAN StressCap AND REMAINING LAUNCH DELAY
IS ZERO
      THEN APPROVE LAUNCH
/**
* Sets up the memory array and sets the initial value.
*
*At initialization, the memory value defaults to ProbeDepth*MemoryDepth
* since there is no history on which to perform a calculation.
* Presumably, after enough cycles, this value will settle
* into a narrow range from cycle to cycle and will be the indicator
*/
```

Listing 1: Example Distributed Computing System Pseudo-Code

```
    InitMemory( )
        INITIALIZE MEMORY ACCORDING TO VALUES PASSED TO
CONSTRUCTOR
        CalcMemoryValue( )
    }
    /**
    * Degrades and agents performance by the specified amount
    */
    DegradeAgent( )
        CALCUALTE DEGRADATION AND SET VALUE ON AGENT
    /**
    * Resets the degradation lewl to 0.
    */
    RestoreDegradedAgent( )
        SET DEGRADATIONLEVEL TO ZERO
    /**
    * Calculates the awrage of the values in the memory array
    * Memory get updated and recalculated ewry time the agent
    * launches its own probe.
    *
    * Memory value is for this simulation is the awrage of the elements in the memory array.
    *
    */
    CalcMemoryValue( )
        SET MEMORY VALUE TO AVERAGE OF MEMORY ARRAY VALUES
    /**
    * Memory should only get updated when the Agent docks it's
    * own probe
    */
    UpdateMemory( )
        COPY EACH ELEMENT INTO NEXT SLOT OF MEMORY ARRAY
        SET FIRST SLOT TO NEW VALUE
        CalcMemoryValue( );
class Probe
Fields:
    Path;                  //Array of agents representing its path
    AgentID;               //ID of Agent that owns this probe
    CurrentStep            // Current step in the probes path
    Destination            //ID of next agent in path
    Location               //ID of agent where it is at.
    CycleLaunched          // What cycle in the simulation the probe was launched
    Depth                  //Length of probe path
    Range                  //Maximum hop distance. Equal to number if agents for
this simulation
Methods:
GetPath( )
GetAgentID( )
GetCurrentStep( ) //Step is the probes location in its path not the current cycle
GetCycleLaunched( )
GetDepth( )
GetRange( )
GetDestination( )
GetLocation( )
SetLocation( )
Probe( ) //Probe Constructor
    CONSTRUCT PROBE WITH PARAMETERS SPECIFIED
/**
* Initializes the path the probe takes to through the network.
* The next step in a path can go to any other agent
* in the network except the owning agent.
* Se(fpathing is a conwnience for this simulation only and is not a typical
* method for paths to be deriwd. In general, a path would be assigned by
* the control system. A probe in general has insufficient knowledge of the network
* to create a path. In this simulation, the size of the agent array is the extent
* of the network and as such the agent ID is the index into that array. This is
* sufficient for a probe to set a path by assuming any value that maps to the
* agent array indexes is a valid agent ID
*/
InitPath( )
    INITIALIZE PATH WITH RANDOM AGENT LOCATIONS
/**
* Launches a probe. Returns the next step in its path. If the next step
* exceeds the path length it resets to the first step.
```

| Listing 1: Example Distributed Computing System Pseudo-Code |
|---|
| ```
*/
Launch( )
  SET CYCLE PROBE IS LAUNCHED
  LAUNCH PROBE TO NEXT AGENT
``` |

It is noted that the listing above does not support the communication layer necessary to connect separate hosts. This is because the communication protocol for each host type can vary and including it in the prototype is not necessary to demonstrate the core functioning. The above listing is a simulation of an agent network that only demonstrates the pathing, probe transit, agent tasking and fitness aspects. Note, however, that the communication layer is by design loosely coupled to the core agent/probe behaviors.

The agent manager can serve as a good proxy for a control system. It functions to create and initialize probes and agents and manage the state of the system as a whole. But for clarity sake, it does not address any difficult issues a real world implementation would have to deal with, such as agents being off line, authentication and authorization, injecting control probes, etc. The Agent Manager serves as a good illustration of the flexibility of the control system. The "controller" only includes the essentials necessary to allow probes to navigate a network and interact with agents. One skilled in the distributed computing art can start with the above model and add complexity to the control system to suit the particular problem space.

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A distributed computing system, comprising:
   a plurality of interconnected host computing devices one or more of which are in communication with a control mechanism;
   a plurality of agents, each agent implemented on a host computing device wherein each host computing device is operative to implement one or more agents, each agent in communication with neighboring agents on a defined ordered path thereby forming a distributed computing network and operative to receive, process and dispatch probes among said agents;
   wherein probes are generated by agents and said control mechanism, contain data and/or code, and traverse said distributed computing network in accordance with one or more defined ordered paths, each path consisting of a unique ordered sequence of connected agents;

each agent comprising:
  one or more probe queues operative to receive and hold probes for processing by a respective agent;
  at least one task to be performed by said respective agent;
wherein communication among agents occurs only through an exchange of probes on a path;
wherein information is exchanged among agents, and tasks are distributed to agents in a particular path by sending and receiving probes among the agents in the particular path; and
wherein a computation is broken down into a sequence of tasks distributed via probes to agents along the particular path, the computation performed by combined action of all agents on the particular path.

2. The system according to claim 1, wherein each agent further comprises host metrics including at least one of data and functions that define a current state of an agent's host.

3. The system according to claim 1, wherein agent and probe IDs are managed utilizing one or more lists on an agent or probe.

4. The system according to claim 1, wherein each agent further comprises:
  a fitness indication operative to represent an agent's overall health; and
  a fitness function operative to manage the fitness of an agent.

5. The system according to claim 1, wherein each probe further comprises a path comprising a sequence of values specifying vertices visited by a particular probe, wherein each value specifies a vertex representing a location of an agent in a graph.

6. The system according to claim 1, wherein each probe further comprises a payload consisting of at least one of data, data structure, executable code, agent and/or probe.

7. The system according to claim 1, wherein each probe further comprises a type consisting of an identifier used to encapsulate specific behavior of said probe.

8. The system according to claim 1, wherein each probe further comprises an ownership field indicating which agent owns the particular probe.

9. The system according to claim 1, wherein each host may comprise at least one of a physical device, virtual device and software.

10. The system according to claim 1, wherein said one or more probe queues comprises a general queue operative to receive probes of any type and process probes in a predetermined order.

11. The system according to claim 1, wherein said one or more probe queues comprises a control queue operative to receive and process control probes.

12. The system according to claim 1, wherein said one or more probe queues comprises a message queue operative to store message probes received by an agent.

13. The system according to claim 1, wherein said one or more probe queues comprises an inactive queue operative to store probes deactivated by an agent, wherein probes in said inactive queue are deactivated, reactivated or destroyed by an agent based on at least one of a state of the agent and a directive issued by said control mechanism.

14. The system according to claim 1, wherein said control mechanism is operative to host any or all of a user interface, zero or more databases for data collected by said agents and software for implementing visualization and analytics functions.

15. The system according to claim 1, wherein said plurality of agents and said probes are configured to generate one or more deterministic logic circuits.

16. The system according to claim 1, wherein said plurality of agents and said probes are configured to generate one or more Turing machines.

17. A method of distributed computing, the method comprising:
  providing a plurality of interconnected host computing devices one or more of which are in communication with a control mechanism;
  providing a plurality of agents, each agent implemented on a host computing device wherein each host computing device is operative to implement one or more agents, each agent in communication with neighboring agents on a defined ordered path thereby forming a distributed computing network;
  receiving, processing and dispatching probes containing at least one of data, object code and source code among said agents, wherein probes are generated by said agents, contain data and/or code, and traverse said distributed computing network in accordance with one or more defined ordered paths, each path consisting of a unique ordered sequence of agents;
  wherein communication among agents occurs only through an exchange of probes on a path;
  breaking down a computation into a sequence of tasks to be performed by the agents on a path, the computation performed by combined action of all agents on the path;
  wherein information is exchanged among agents, and said tasks are distributed to agents in a particular path by sending and receiving probes among the agents in the particular path;
  performing said computation by the agents within the particular path and returning any results;
  controlling said distributed computing network utilizing said control mechanism in communication with at least one agent; and
  generating control probes and injecting said control probes into said distributed computing network via an agent in communication with said control mechanism.

\* \* \* \* \*